United States Patent
Tanaka et al.

(10) Patent No.: US 11,302,915 B2
(45) Date of Patent: Apr. 12, 2022

(54) NEGATIVE ELECTRODE FOR NON-AQUEOUS ELECTROLYTE SECONDARY BATTERY

(71) Applicant: Nissan Motor Co., Ltd., Yokohama (JP)

(72) Inventors: Hiroyuki Tanaka, Kanagawa (JP); Gentaro Kano, Kanagawa (JP); Hideaki Horie, Kanagawa (JP); Yuki Kusachi, Kanagawa (JP); Yusuke Nakashima, Kyoto (JP); Kazuya Minami, Kyoto (JP)

(73) Assignee: Nissan Motor Co., Ltd., Yokohama (JP)

( * ) Notice: Subject to any disclaimer, the term of this patent is extended or adjusted under 35 U.S.C. 154(b) by 253 days.

(21) Appl. No.: 16/335,955

(22) PCT Filed: Aug. 15, 2017

(86) PCT No.: PCT/JP2017/029366
§ 371 (c)(1),
(2) Date: Mar. 22, 2019

(87) PCT Pub. No.: WO2018/055956
PCT Pub. Date: Mar. 29, 2018

(65) Prior Publication Data
US 2020/0028166 A1 Jan. 23, 2020

(30) Foreign Application Priority Data
Sep. 26, 2016 (JP) .............................. JP2016-187516

(51) Int. Cl.
*H01M 4/48* (2010.01)
*H01M 4/62* (2006.01)
(Continued)

(52) U.S. Cl.
CPC ............. *H01M 4/483* (2013.01); *H01M 4/13* (2013.01); *H01M 4/625* (2013.01); *H01M 4/64* (2013.01);
(Continued)

(58) Field of Classification Search
CPC ........ H01M 4/483; H01M 4/13; H01M 4/625; H01M 4/64; H01M 10/0525;
(Continued)

(56) References Cited

U.S. PATENT DOCUMENTS 6,432,585 B1    8/2002   Kawakami et al.
6,902,847 B1 *   6/2005   Yata .................... H01M 50/543
                                                                                    429/231.8
(Continued)

FOREIGN PATENT DOCUMENTS

EP          3240095 A1    11/2017
JP          3619000 B2 *   1/1998
(Continued)

*Primary Examiner* — Kaity V Chandler
(74) *Attorney, Agent, or Firm* — Young Basile Hanlon & MacFarlane, P.C.

(57) ABSTRACT

A negative electrode for non-aqueous electrolyte secondary battery provides a means for improving output characteristics at a high rate. The negative electrode has a negative electrode active material layer having a thickness of 150 to 1500 μm formed on a surface of a current collector. In addition, the negative electrode active material layer includes coated negative electrode active material particles in which at least a part of a surface of a negative electrode active material is coated with a coating agent containing a coating resin and a conductive aid. Furthermore, a porosity of the negative electrode active material layer is 39.0% to 60.0% and a density of the negative electrode active material layer is 0.60 to 1.20 g/cm³.

9 Claims, 2 Drawing Sheets

(51) Int. Cl.
*H01M 4/13* (2010.01)
*H01M 4/64* (2006.01)
*H01M 10/0525* (2010.01)
*H01M 4/02* (2006.01)

(52) U.S. Cl.
CPC .. *H01M 10/0525* (2013.01); *H01M 2004/027* (2013.01)

(58) Field of Classification Search
CPC ..... H01M 2004/027; H01M 2004/021; H01M 2220/20; H01M 4/134; H01M 4/36; H01M 4/62; H01M 4/623; H01M 4/133; H01M 4/621; H01M 50/325; H01M 50/3425; H01M 50/489; H01M 50/491; H01M 50/70; H01M 6/045; H01M 6/08; H01M 6/085; H01M 6/18; H01M 6/188; H01M 6/44; H01M 8/02; H01M 8/0693; H01M 8/083; H01M 8/1023; H01M 8/1039; H01M 8/1053; H01M 8/18; H01M 10/044; H01M 10/12; H01M 10/288; H01M 10/617; H01M 10/633; H01M 10/6568; H01M 10/66; H01M 12/065; H01M 2004/8684; H01M 2010/0495; H01M 2300/0008; H01M 4/0411; H01M 4/0461; H01M 4/0466; H01M 4/14; H01M 4/21; H01M 4/242; H01M 4/383; H01M 4/664; H01M 4/669; H01M 4/73; H01M 4/745; H01M 50/15; H01M 50/1535; H01M 50/155; H01M 50/213; H01M 4/0442; H01M 4/08; H01M 4/1315; H01M 4/24; H01M 4/72; H01M 4/803; H01M 4/881; H01M 4/8814; H01M 4/9016; H01M 4/9075; H01M 50/105; H01M 50/172; H01M 50/258; H01M 50/30; H01M 50/50; H01M 50/557; H01M 6/166; H01M 8/023; H01M 8/0232; H01M 8/0247; H01M 8/0289; H01M 8/0297; H01M 8/0432; H01M 8/0438; H01M 8/04447; H01M 8/04492; H01M 8/04559; H01M 8/04589; H01M 8/04798; H01M 8/04992; H01M 8/1004; Y02E 60/10
See application file for complete search history.

(56) References Cited

U.S. PATENT DOCUMENTS

| | | | | |
|---|---|---|---|---|
| 8,137,846 | B2* | 3/2012 | Nakashima | H01M 50/446 |
| | | | | 429/247 |
| 10,468,679 | B2* | 11/2019 | Yamamoto | H01M 4/505 |
| 2012/0237821 | A1* | 9/2012 | Mitsuhashi | H01M 4/0404 |
| | | | | 429/211 |
| 2017/0033350 | A1 | 2/2017 | Mizuno et al. | |
| 2017/0098822 | A1 | 4/2017 | Yachi et al. | |
| 2017/0162906 | A1* | 6/2017 | Nakazawa | H01M 10/0567 |

FOREIGN PATENT DOCUMENTS

| | | |
|---|---|---|
| JP | H11242954 A | 9/1999 |
| JP | 2005-063955 A | 3/2005 |
| JP | 2005317469 A | 11/2005 |
| JP | 2012209161 A | 10/2012 |
| JP | 2015167065 A | 9/2015 |
| WO | 2015093411 A1 | 6/2015 |
| WO | 2015147234 A1 | 10/2015 |
| WO | 2016104679 A1 | 6/2016 |

* cited by examiner

NEGATIVE ELECTRODE FOR NON-AQUEOUS ELECTROLYTE SECONDARY BATTERY

CROSS REFERENCE TO RELATED APPLICATION

The present application claims priority to Japanese Patent Application No. 2016-187516, filed Sep. 26, 2016, incorporated herein in its entirety.

TECHNICAL FIELD

The present invention relates to a negative electrode for non-aqueous electrolyte secondary battery.

BACKGROUND

In recent years, spread of various electric vehicles has been expected in order to solve environmental and energy problems. A secondary battery has been actively developed as an in-vehicle power source such as a motor driving power source which is a key to the spread of these electric vehicles. In an electric vehicle, a secondary battery having a higher energy density is desired in order to increase a cruising distance per one charge.

Examples of a means for increasing the energy density of a battery include a method for increasing the density of an active material in an active material layer. However, if the density of the active material is merely increased, voids in the active material layer are reduced, and it may be impossible to cause an electrolyte (electrolytic solution) necessary for a charge/discharge reaction to sufficiently permeate the active material layer and to hold the electrolyte (electrolytic solution) therein. As a result, problems may occur that the battery deteriorates in energy density, the input/output characteristic at a high rate (charging-discharging performance at high rate) deteriorates, and the charging-discharging cycle characteristic deteriorates.

In order to solve such a problem, Japanese Patent Application Publication No. 2005-63955 A has proposed a method for manufacturing a high-density electrode having a porosity of 25% or less by adding a carbon fiber having a fiber diameter of 1 to 1000 nm to a material for an electrode active material. The literature describes that the above method makes it possible to obtain a high-performance battery having a high energy density and favorable high-speed charge/discharge performance without impairing electrolytic solution permeability or electrolytic solution holding property even when the porosity is small.

SUMMARY

Meanwhile, as another means for increasing the energy density of the battery, there is a method for increasing the thickness of (thickening) an active material layer per electrode.

However, according to studies of the present inventors, it has been found that merely thickening of an active material layer by a conventional method lowers output characteristics at a high rate, important for use as an in-vehicle power source, disadvantageously.

Therefore, an object of the present invention is to provide a means for improving output characteristics at a high rate in a non-aqueous electrolyte secondary battery including a thickened negative electrode active material layer.

The present inventors have made intensive studies in order to solve the above problem. As a result, the present inventors have found that, in a case where a negative electrode active material layer is thickened, by coating a negative electrode active material with a coating agent containing a coating resin and a conductive aid and controlling the porosity and the density of the negative electrode active material layer within a predetermined range, the above problem can be solved, and have completed the present invention.

That is, the negative electrode for non-aqueous electrolyte secondary battery according to the present invention has a negative electrode active material layer having a thickness of 150 to 1500 μm formed on a surface of a current collector. In addition, the negative electrode active material layer includes coated negative electrode active material particles in which at least a part of a surface of a negative electrode active material is coated with a coating agent containing a coating resin and a conductive aid. Furthermore, a porosity of the negative electrode active material layer is 39.0% to 60.0% and a density of the negative electrode active material layer is 0.60 to 1.20 g/cm$^3$.

DETAILED DESCRIPTION

Figure 1:
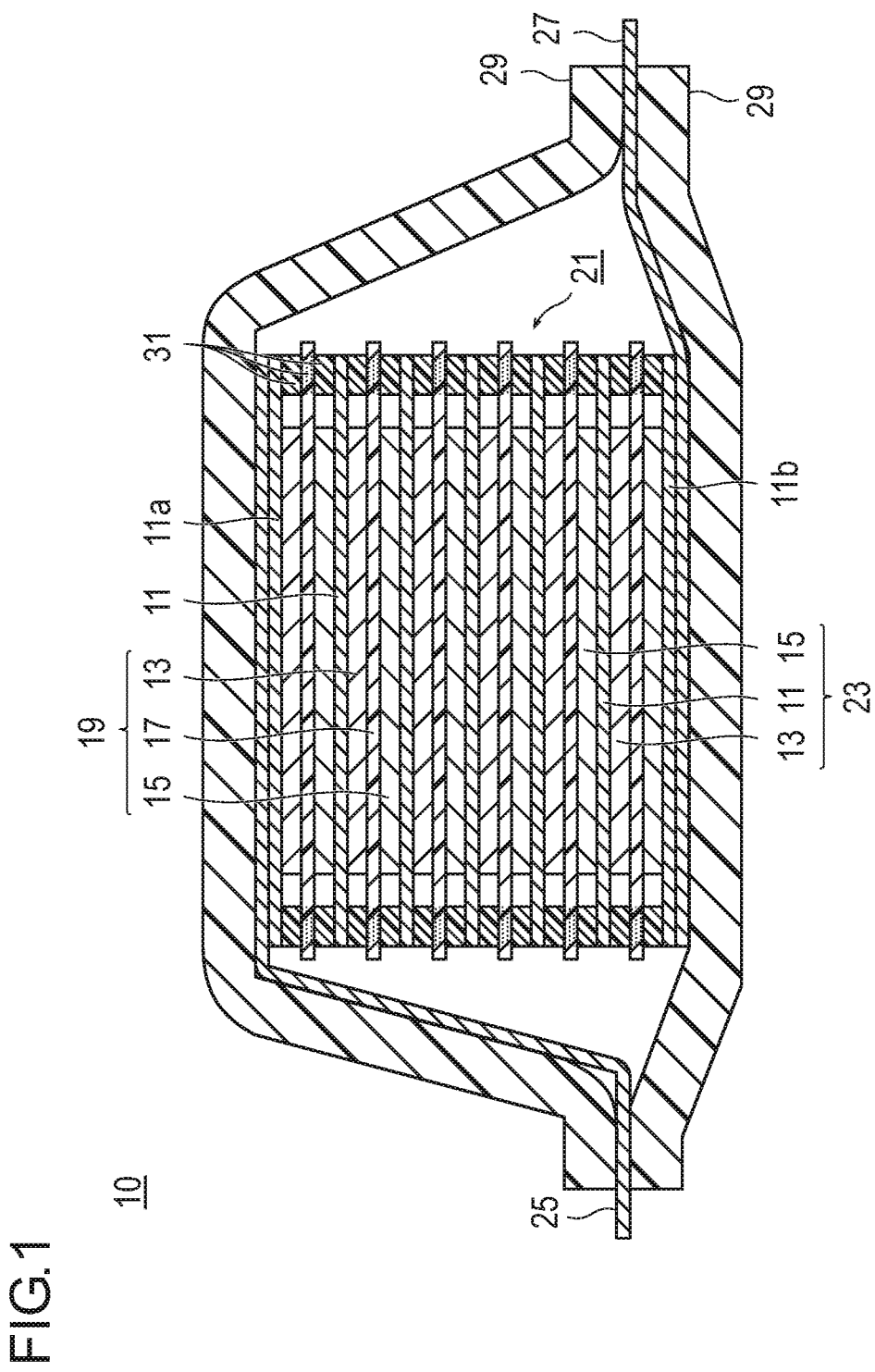
FIG. 1 is a cross-sectional view schematically illustrating a bipolar secondary battery which is an embodiment of the present invention.

A negative electrode for non-aqueous electrolyte secondary battery according to the present invention has a negative electrode active material layer having a thickness of 150 to 1500 μm formed on a surface of a current collector. In addition, the negative electrode active material layer includes coated negative electrode active material particles in which at least a part of a surface of a negative electrode active material is coated with a coating agent containing a coating resin and a conductive aid. Furthermore, a porosity of the negative electrode active material layer is 39.0% to 60.0% and a density of the negative electrode active material layer is 0.60 to 1.20 g/cm$^3$.

According to the present invention, by the presence of the coating resin and the conductive aid on a surface of the negative electrode active material, an ion conduction path from the surface of the negative electrode active material to an electrolytic layer and an electron conduction path from the surface of the negative electrode active material to a current collector can be secured. In addition, by controlling the porosity and the density of the negative electrode active material layer within a predetermined range, the ratio of the negative electrode active material contained per unit volume of the negative electrode active material layer can be increased while electron transfer resistance in the negative electrode active material layer is suppressed. This makes it possible to maintain high ion conductivity and electronic conductivity even in the thickened negative electrode active material layer. As a result, output characteristics at a high rate can be improved in a non-aqueous electrolyte secondary battery including a thickened negative electrode active material layer.

Although a detailed mechanism by which the present invention exerts the above effects is unknown, the mechanism is presumed as follows. Note that the technical scope of the present invention is not limited to the following mechanism at all.

As described above, according to the studies of the present inventors, it has been found that merely thickening of an active material layer by a conventional method lowers output characteristics at a high rate disadvantageously. As a result of further studies, it has been found that the above problem arises due to an increase in electron transfer resistance and ion transfer resistance in the active material layer due to thickening of the active material layer. That is, for example, in a discharge reaction, ions (for example, lithium ions) are released from a negative electrode active material, are transferred to a positive electrode active material through an electrolyte (electrolytic solution), and occluded. Electrons are transferred from the negative electrode active material to the positive electrode active material through a current collector. Here, as the thickness of the active material layer increases, an average transfer distance of ions and electrons increases. Therefore, merely thickening of the active material layer increases ion transfer resistance and electron transfer resistance of the entire active material layer.

As a result of intensive studies, the present inventors have found that, in a negative electrode for non-aqueous electrolyte secondary battery, by (i) coating at least a part of a surface of a negative electrode active material with a coating agent containing a coating resin and a conductive aid; (ii) setting the porosity of a negative electrode active material layer to 39.0 to 60.0%; and (iii) setting the density of the negative electrode active material layer to 0.60 to 1.20 g/cm$^3$, the above problem can be solved, and have completed the present invention.

By (i) coating at least a part of a surface of a negative electrode active material with a coating agent containing a coating resin and a conductive aid, an ion conduction path from the surface of the negative electrode active material to an electrolytic layer and an electron conduction path from the surface of the negative electrode active material to a current collector can be secured. In addition, by (ii) setting the porosity of a negative electrode active material layer to 39.0 to 60.0% and (iii) setting the density of the negative electrode active material layer to 0.60 to 1.20 g/cm$^3$, the ratio of the negative electrode active material contained per unit volume of the negative electrode active material layer can be increased while electron transfer resistance in the negative electrode active material layer is suppressed. As a result, it is considered that output characteristics at a high rate can be improved in a non-aqueous electrolyte secondary battery including a thickened negative electrode active material layer.

Hereinafter, an embodiment of the present invention will be described with reference to the drawings. A technical scope of the present invention should be determined based on claims, and is not limited only to the following embodiment. Hereinafter, the present invention will be described by exemplifying a bipolar lithium ion secondary battery which is an embodiment of a non-aqueous electrolyte secondary battery. Note that, in the description of the drawings, the same elements are denoted by the same reference numerals, and duplicate descriptions are omitted. The dimension ratio of the drawings is exaggerated for convenience of explanation, and may be different from the actual ratio. In this specification, "X to Y" indicating a range means "X or more and Y or less". Unless otherwise specified, operations and measurement of physical properties or the like are performed under the conditions of room temperature (20 to 25° C.)/relative humidity of 40 to 50%.

In this specification, a bipolar lithium ion secondary battery may also be simply referred to as a "bipolar secondary battery", and a bipolar lithium ion secondary battery electrode may be simply referred to as a "bipolar electrode".

<Bipolar Secondary Battery>

FIG. 1 is a cross-sectional view schematically illustrating a bipolar secondary battery which is an embodiment of the present invention. In a bipolar secondary battery 10 illustrated in FIG. 1, a substantially rectangular power generating element 21 in which a charge/discharge reaction proceeds actually is sealed in a laminate film 29 serving as a battery exterior body.

As illustrated in FIG. 1, the power generating element 21 of the bipolar secondary battery 10 of the present embodiment includes a plurality of bipolar electrodes 23 in each of which an electrically bonded positive electrode active material layer 13 is formed on one surface of a current collector 11, and an electrically bonded negative electrode active material layer 15 is formed on the other surface of the current collector 11. The bipolar electrodes 23 are laminated through electrolytic layers 17 to form the power generating element 21. Note that the electrolytic layer 17 holds an electrolyte in the center thereof in a plane direction of a separator as a substrate. In this case, the bipolar electrode 23 and the electrolytic layer 17 are laminated alternatively such that a positive electrode active material layer 13 of one bipolar electrode 23 faces a negative electrode active material layer 15 of the other bipolar electrode 23 adjacent to the one bipolar electrode 23 through the electrolytic layer 17. That is, the electrolytic layer 17 is sandwiched between the positive electrode active material layer 13 of one bipolar electrode 23 and the negative electrode active material layer 15 of the other bipolar electrode 23 adjacent to the one bipolar electrode 23.

Although not illustrated, in the bipolar secondary battery 10 of FIG. 1, the positive electrode active material layer 13 includes a positive electrode active material (coated positive electrode active material particles) coated with a coating agent containing acetylene black as a conductive aid and a methacrylate-based copolymer as a coating resin and a carbon fiber as a conductive member. The carbon fiber forms a conductive path for electrically connecting a first main surface in contact with the electrolytic layer 17 side of the positive electrode active material layer 13 to a second main surface in contact with the current collector 11 side. Furthermore, the conductive path is electrically connected to the positive electrode active material. Similarly, the negative electrode active material layer 15 includes a negative electrode active material (coated negative electrode active material particles) coated with a coating agent containing acetylene black as a conductive aid and a methacrylate-based copolymer as a coating resin and a carbon fiber as a conductive member. The carbon fiber forms a conductive path for electrically connecting a first main surface in contact with the electrolytic layer 17 side of the negative electrode active material layer 15 to a second main surface in contact with the current collector 11 side. Furthermore, the conductive path is electrically connected to the negative electrode active material.

The positive electrode active material layer 13, the electrolytic layer 17, and the negative electrode active material layer 15 adjacent to each other form one unit battery layer 19. Therefore, it can be said that the bipolar secondary battery 10 has a configuration in which the unit battery layers 19 are laminated. A sealing portion (insulating layer) 31 is disposed on an outer peripheral portion of the unit battery layer 19. This prevents liquid junction due to leakage of an electrolytic solution from the electrolytic layer 17, and prevents a short circuit caused by contact between adjacent current collectors 11 in the battery, slight misalignment of an end portion of the unit battery layer 19 in the power generating element 21, or the like. Note that the positive electrode active material layer 13 is formed only on one surface of an outermost layer current collector 11a on the positive electrode side, positioned in an outermost layer of the power generating element 21. The negative electrode active material layer 15 is formed only on one surface of an outermost layer current collector 11b on the negative electrode side, positioned in an outermost layer of the power generating element 21.

Furthermore, in the bipolar secondary battery 10 illustrated in FIG. 1, a positive electrode current collecting plate (positive electrode tab) 25 is disposed so as to be adjacent to the outermost layer current collector 11a on the positive electrode side. The positive electrode current collecting plate 25 is extended and led out from the laminate film 29 serving as a battery exterior body. Meanwhile, a negative electrode current collecting plate (negative electrode tab) 27 is disposed so as to be adjacent to the outermost layer current collector 11b on the negative electrode side. Similarly, the negative electrode current collecting plate 27 is extended and led out from the laminate film 29.

Note that the number of laminating the unit battery layer 19 is adjusted according to a desired voltage. In the bipolar secondary battery 10, the number of laminating the unit battery layer 19 may be small as long as a sufficient output can be ensured even when the battery is extremely thin. In order to prevent external impact and environmental deterioration at the time of use, also in the bipolar secondary battery 10, preferably, the power generating element 21 is sealed in the laminate film 29 serving as a battery exterior body under reduced pressure, and the positive electrode current collecting plate 25 and the negative electrode current collecting plate 27 are taken out of the laminate film 29. Although the embodiment of the present invention has been described by exemplifying the bipolar secondary battery, the type of a non-aqueous electrolyte secondary battery to which the present invention can be applied is not particularly limited. For example, the present invention can also be applied to any conventionally known non-aqueous electrolyte secondary battery such as a so-called parallel laminate type battery in which unit battery layers are connected in parallel in a power generating element.

Hereinafter, main components of the bipolar secondary battery of the present embodiment will be described.

[Current Collector]

The current collector has a function of mediating transfer of electrons from one surface in contact with the positive electrode active material layer to the other surface in contact with the negative electrode active material layer. A material constituting the current collector is not particularly limited, but for example, a metal or a conductive resin can be adopted.

Specific examples of the metal include aluminum, nickel, iron, stainless steel, titanium, copper, and the like. In addition to these metals, a clad material of nickel and aluminum, a clad material of copper and aluminum, a plating material of a combination of these metals, or the like can be preferably used. A foil obtained by coating a surface of a metal with aluminum may be used. Among these metals, aluminum, stainless steel, copper, and nickel are preferable from viewpoints of electron conductivity, battery operating potential, adhesion of a negative electrode active material by sputtering to a current collector, and the like.

Examples of the latter conductive resin include a resin in which a conductive filler is added to a conductive polymer material or a non-conductive polymer material as necessary. Examples of the conductive polymer material include polyaniline, polypyrrole, polythiophene, polyacetylene, polyparaphenylene, polyphenylene vinylene, polyacrylonitrile, polyoxadiazole, and the like. Such a conductive polymer material is advantageous in terms of simplification of a manufacturing process or reduction in weight of a current collector because of having sufficient conductivity without adding a conductive filler.

Examples of the non-conductive polymer material include polyethylene (PE: high density polyethylene (HDPE), low density polyethylene (LDPE), or the like), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVDF), polystyrene (PS), and the like. Such a non-conductive polymer material can have excellent potential resistance or solvent resistance.

A conductive filler may be added to the conductive polymer material or the non-conductive polymer material as necessary. Particularly, in a case where a resin serving as a substrate of the current collector is made only of the non-conductive polymer, a conductive filler is essentially required in order to impart conductivity to the resin.

The conductive filler can be used without particular limitation as long as having conductivity. Examples of a material having excellent conductivity, potential resistance, or lithium ion blocking property include a metal, conductive carbon, and the like. The metal is not particularly limited, but preferably contains at least one metal selected from the group consisting of Ni, Ti, Al, Cu, Pt, Fe, Cr, Sn, Zn, In, Sb, and K, or an alloy or a metal oxide containing these metals. The conductive carbon is not particularly limited. The conductive carbon preferably contains at least one selected from the group consisting of acetylene black, vulcan (registered trademark), black pearl (registered trademark), carbon nanofiber, Ketjen black (registered trademark), carbon nanotube, carbon nanohorn, carbon nanoballoon, and fullerene.

The addition amount of the conductive filler is not particularly limited as long as sufficient conductivity can be imparted to the current collector. In general, the addition amount is about 5 to 35% by mass.

Note that the current collector of the present embodiment may have a single layer structure made of a single material or a laminated structure in which layers made of these materials are appropriately combined. The current collector preferably includes at least a conductive resin layer made of a conductive resin from a viewpoint of reduction in weight of the current collector. In addition, a metal layer may be disposed on a part of the current collector from a viewpoint of blocking transfer of lithium ions between unit battery layers.

[Negative Electrode Active Material Layer]

The negative electrode active material layer contains a negative electrode active material and a coating agent for coating a surface of the negative electrode active material. In addition, the negative electrode active material layer may contain a conductive member, an ion conductive polymer, a lithium salt, and the like as necessary.

Note that, in this specification, the negative electrode active material coated with a coating agent is also referred to as "coated negative electrode active material particles".

The coated negative electrode active material particles have a core-shell structure in which a shell portion made of a coating agent containing a coating resin and a conductive aid is formed on a surface of a core portion made of a negative electrode active material.

(Negative Electrode Active Material)

Examples of the negative electrode active material include a carbon material such as graphite, soft carbon, or hard carbon, a lithium-transition metal composite oxide (for example, $Li_4Ti_5O_{12}$), a metal material (tin or silicon), a lithium alloy-based negative electrode material (for example, a lithium-tin alloy, a lithium-silicon alloy, a lithium-aluminum alloy, a lithium-aluminum-manganese alloy, or the like), and the like. Two or more negative electrode active materials may be used in combination in some cases. Preferably, a carbon material, a lithium-transition metal composite oxide, and a lithium alloy-based negative electrode material are preferably used as a negative electrode active material from viewpoints of capacity and output characteristics. Incidentally, of course, a negative electrode active material other than the above materials may be used. In addition, the above-described coating resin easily adheres particularly to a carbon material. Therefore, a carbon material is preferably used as the negative electrode active material from a viewpoint of providing a structurally stable electrode material.

The average particle diameter of the negative electrode active material is not particularly limited, but is preferably 1 to 100 μm, and more preferably 1 to 20 μm from a viewpoint of high output.

(Coating Agent)

The coating agent includes a coating resin and a conductive aid. By the presence of the coating agent on a surface of the negative electrode active material, an ion conduction path from the surface of the negative electrode active material to an electrolytic layer and an electron conduction path from the surface of the negative electrode active material to a current collector can be secured in the negative electrode active material layer.

(Coating Resin)

The coating resin is present on a surface of the negative electrode active material and has a function of absorbing and holding an electrolytic solution. This makes it possible to form an ion conduction path from the surface of the negative electrode active material to an electrolytic layer in the negative electrode active material layer.

In the bipolar secondary battery of the present embodiment, a material of the coating resin is not particularly limited, but preferably contains at least one selected from the group consisting of a polyurethane resin (A) and a polyvinyl-based resin (B) from viewpoints of flexibility and liquid absorbability.

(A) Polyurethane Resin

A polyurethane resin has high flexibility (large tensile elongation at break described later), and urethane bonds can form a strong hydrogen bond. Therefore, use of the polyurethane resin as a coating resin makes it possible to form a coating agent having structural stability together with excellent flexibility.

A specific form of the polyurethane resin is not particularly limited, and conventionally known knowledge concerning the polyurethane resin can be appropriately referred to. The polyurethane resin contains a polyisocyanate component (a1) and a polyol component (a2), and may further contain an ionic group introducing component (a3), an ionic group neutralizing agent component (a4), and a chain extender component (a5) as necessary.

Examples of the polyisocyanate component (a1) include a diisocyanate compound having two isocyanate groups in one molecule and a polyisocyanate compound having three or more isocyanate groups in one molecule. These compounds may be used singly or in combination of two or more kinds thereof.

Examples of the diisocyanate compound include: an aromatic diisocyanate such as 4,4'-diphenylmethane diisocyanate (MDI), 2,4- and/or 2,6-tolylene diisocyanate, p-phenylene diisocyanate, xylylene diisocyanate, 1,5-naphthalene diisocyanate, 3,3'-dimethyl diphenyl-4,4'-diisocyanate, dianisidine diisocyanate, or tetramethylxylylene diisocyanate; an alicyclic diisocyanate such as isophorone diisocyanate, dicyclohexylmethane-4,4'-diisocyanate, trans-1,4-cyclohexyl diisocyanate, or norbornene diisocyanate; and an aliphatic diisocyanate such as 1,6-hexamethylene diisocyanate, 2,2,4 and/or (2,4,4)-trimethylhexamethylene diisocyanate, or lysine diisocyanate.

These diisocyanate compounds may be used in a form of a modified product such as carbodiimide modification, isocyanurate modification, or biuret modification, or in a form of a blocked isocyanate blocked with various blocking agents.

Examples of the polyisocyanate compound having three or more isocyanate groups in one molecule include: an isocyanurate trimer of the above exemplified diisocyanate, a biuret trimer thereof, a trimethylolpropane adduct thereof, and the like; and a trifunctional or higher functional isocyanate or the like such as triphenylmethane triisocyanate, 1-methylbenzole-2,4,6-triisocyanate, or dimethyltriphenylmethane tetraisocyanate. These isocyanate compounds may be used in a form of a modified product such as carbodiimide modification, isocyanurate modification, or biuret modification, or in a form of a blocked isocyanate blocked with various blocking agents.

Examples of the polyol component (a2) include a diol compound having two hydroxyl groups in one molecule and a polyol compound having three or more hydroxyl groups in one molecule. These compounds may be used singly or in combination of two or more kinds thereof.

Examples of the diol compound and the polyol compound having three or more hydroxyl groups in one molecule include a low molecular weight polyol, a polyether polyol, a polyester polyol, a polyester polycarbonate polyol, a crystalline or noncrystalline polycarbonate polyol, a polybutadiene polyol, and a silicone polyol.

Examples of the low molecular weight polyol include: an aliphatic diol such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, or 1,10-decanediol; an alicyclic diol such as cyclohexanedimethanol or cyclohexanediol; and a trihydric or higher hydric polyol such as trimethylolethane, trimethylolpropane, a hexitol, a pentitol, glycerin, polyglycerin, pentaerythritol, dipentaerythritol, or tetramethylol propane.

Examples of the polyether polyol include: an ethylene oxide adduct such as diethylene glycol, triethylene glycol, tetraethylene glycol, or polyethylene glycol; a propylene oxide adduct such as dipropylene glycol, tripropylene glycol, tetrapropylene glycol, or polypropylene glycol; an ethylene oxide and/or propylene oxide adduct of the low molecular weight polyol; polytetramethylene glycol, and the like.

Examples of the polyester polyol include a compound obtained by a direct esterification reaction and/or a transesterification reaction between a polyol such as the above exemplified low molecular weight polyol and a polycarboxylic acid in an amount smaller than the stoichiometric amount of the polyol or an ester-forming derivative thereof such as an ester, an anhydride, or a halide, and/or a lactone or a hydroxycarboxylic acid obtained by hydrolytic ring-opening of the lactone. Examples of the polycarboxylic acid or an ester-forming derivative thereof include: as the polycarboxylic acid, an aliphatic dicarboxylic acid such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, or dimer acid; an aromatic dicarboxylic acid such as phthalic acid, terephthalic acid, isophthalic acid, or naphthalene dicarboxylic acid; an alicyclic dicarboxylic acid such as cyclohexane dicarboxylic acid; a tricarboxylic acid such as trimellitic acid, trimesic acid, or a trimer of castor oil fatty acid; and a tetracarboxylic acid such as pyromellitic acid, and include: as an ester-forming derivative of the polycarboxylic acid, acid anhydrides of these polycarboxylic acids, halides of the polycarboxylic acids, such as a chloride or a bromide; and lower aliphatic esters of these polycarboxylic acids, such as a methyl ester, an ethyl ester, a propyl ester, an isopropyl ester, a butyl ester, an isobutyl ester, an amyl ester, or the like. Examples of the lactone include a lactone such as γ-caprolactone, δ-caprolactone, ε-caprolactone, dimethyl-ε-caprolactone, δ-valerolactone, γ-valerolactone, or γ-butyrolactone.

Examples of the ionic group introducing component (a3) used as necessary include a compound that introduces an anionic group and a compound that introduces a cationic group. Examples of the compound that introduces an anionic group include: a polyol containing a carboxyl group, such as dimethylolpropionic acid, dimethylolbutanoic acid, dimethylolbutyric acid, or dimethylolvaleric acid; and a polyol having a sulfonic acid group, such as 1,4-butanediol-2-sulfonic acid. Examples of the compound that introduces a cationic group include an N,N-dialkylalkanolamine, an N-alkyl-N,N-dialkanolamine such as N-methyl-N,N-diethanolamine or N-butyl-N,N-diethanolamine, and a trialkanolamine.

Examples of the ionic group neutralizing agent component (a4) used as necessary include: as an anionic group neutralizing agent, a tertiary amine compound such as trialkylamine including trimethylamine, triethylamine, tributylamine, and the like, an N,N-dialkylalkanolamine including N,N-dimethylethanolamine, N,N-dimethylpropanolamine, N,N-dipropylethanolamine, 1-dimethylamino-2-methyl-2-propanol, and the like, triethanolamine including an N-alkyl-N,N-dialkanolamine, a trialkanolamine, or the like; and a basic compound such as ammonia, trimethylammonium hydroxide, sodium hydroxide, potassium hydroxide, or lithium hydroxide, and include: as a cationic group neutralizing agent, an organic carboxylic acid such as formic acid, acetic acid, lactic acid, succinic acid, glutaric acid, or citric acid; an organic sulfonic acid such as p-toluenesulfonic acid or alkyl sulfonate; an inorganic acid such as hydrochloric acid, phosphoric acid, nitric acid, or sulfonic acid; an epoxy compound such as epihalohydrin; and a quaternizing agent such as dialkyl sulfuric acid or alkyl halide.

As the chain extender component (a5) used as necessary, one or more well-known general chain extenders can be used. A polyvalent amine compound, a polyhydric primary alcohol compound, and the like are preferable, and a polyvalent amine compound is more preferable. Examples of the polyvalent amine compound include: a low molecular weight diamine in which an alcoholic hydroxyl group of the above exemplified low molecular weight diol such as ethylenediamine or propylenediamine is replaced by an amino group; a polyether diamine such as polyoxypropylene diamine or polyoxyethylene diamine; an alicyclic diamine such as menthendiamine, isophoronediamine, norbornenediamine, bis(4-amino-3-methyldicyclohexyl) methane, diaminodicyclohexylmethane, bis(aminomethyl) cyclohexane, or 3,9-bis(3-aminopropyl) 2,4,8,10-tetraoxaspiro (5,5) undecane; an aromatic diamine such as m-xylene diamine, α-(m/p aminophenyl) ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, or α,α 14'-bis(4-aminophenyl)-p-diisopropylbenzene; hydrazine; and a dicarboxylic acid dihydrazide compound which is a compound of a dicarboxylic acid exemplified as a polycarboxylic acid used for the above polyester polyol and hydrazine.

Among the above-described components, as the polyisocyanate component (a1), a diisocyanate compound is preferably used, 4,4'-diphenylmethane diisocyanate (MDI), 2,4'-diphenylmethane diisocyanate, 4,4'-dicyclohexyl methane diisocyanate, 1,4-cyclohexane diisocyanate, 2,4-toluene diisocyanate, 1,6-hexamethylene diisocyanate, and the like are particularly preferably used, and 4,4'-diphenylmethane diisocyanate (MDI) is most preferably used. As the polyol component (a2), it is preferable to use an ethylene oxide adduct which is a diol compound as an essential component, and it is particularly preferable to use polyethylene glycol as an essential component. Polyethylene glycol has excellent lithium ion conductivity. Therefore, such a configuration makes it possible to remarkably exhibit an effect of lowering (suppressing raise of) internal resistance of the battery. Here, a number average molecular weight calculated from a hydroxyl value of polyethylene glycol is not particularly limited, but is preferably 2,500 to 15,000, more preferably 3,000 to 13,000, and still more preferably 3,500 to 10,000. Note that it is preferable to further use ethylene glycol and/or glycerin as a polyol component in addition to the above-described essential components from a viewpoint of excellent heat resistance. Particularly, by using only ethylene glycol without using glycerin, a gel obtained by swelling of a coating resin is a physically crosslinked gel, and therefore can be dissolved in a solvent at the time of manufacture. Various manufacturing methods as described later can be applied. Meanwhile, by using glycerin in addition to ethylene glycol, main chains of a polyurethane resin are chemically crosslinked. This case has an advantage that the degree of swelling to an electrolytic solution can be arbitrarily controlled by controlling a molecular weight between crosslinks.

Note that a method for synthesizing a polyurethane resin is not particularly limited, and conventionally known knowledge can be appropriately referred to.

(B) Polyvinyl-Based Resin

A polyvinyl-based resin has high flexibility (large tensile elongation at break described later). Therefore, by using the polyvinyl-based resin as a coating resin, it is possible to relax a volume change of an active material accompanying a charge/discharge reaction and to suppress expansion of an active material layer.

A specific form of the polyvinyl-based resin is not particularly limited. As long as the polyvinyl-based resin is a polymer obtained by polymerizing a monomer containing a polymerizable unsaturated bond-containing monomer (hereinafter also referred to as "vinyl monomer"), conventionally known knowledge can be appropriately referred to.

Particularly, the polyvinyl-based resin preferably contains a vinyl monomer (b1) having a carboxyl group and a vinyl monomer (b2) represented by the following general formula (1) as a vinyl monomer.

[Chemical formula 1]

$$CH_2=C(R^1)COOR^2 \qquad (1)$$

In formula (1), $R^1$ represents a hydrogen atom or a methyl group, and $R^2$ represents a linear alkyl group having 1 to 4 carbon atoms or a branched alkyl group having 4 to 36 carbon atoms.

Examples of the vinyl monomer (b1) having a carboxyl group include: a monocarboxylic acid having 3 to 15 carbon atoms, such as (meth)acrylic acid, crotonic acid, or cinnamic acid; a dicarboxylic acid having 4 to 24 carbon atoms, such as (anhydrous) maleic acid, fumaric acid, (anhydrous) itaconic acid, citraconic acid, or mesaconic acid; a trivalent or tetravalent or higher valent polycarboxylic acid having 6 to 24 carbon atoms, such as aconitic acid; and the like. Among these compounds, (meth)acrylic acid is preferable, and methacrylic acid is particularly preferable.

In the vinyl monomer (b2) represented by the general formula (b 1), $R^1$ represents a hydrogen atom or a methyl group. $R^1$ preferably represents a methyl group.

$R^2$ represents a linear alkyl group having 1 to 4 carbon atoms or a branched alkyl group having 4 to 36 carbon atoms. Specific examples of $R^2$ include a methyl group, an ethyl group, a propyl group, a 1-alkylalkyl group (a 1-methylpropyl group (sec-butyl group), a 1,1-dimethylethyl group (tert-butyl group), a 1-methylbutyl group, a 1-ethylpropyl group, a 1,1-dimethylpropyl group, a 1-methylpentyl group, a 1-ethylbutyl group, a 1-methylhexyl group, a 1-ethylpentyl group, a 1-methylheptyl group, a 1-ethylhexyl group, a 1-methyloctyl group, a 1-ethylheptyl group, a 1-methylnonyl group, a 1-ethyloctyl group, a 1-methyldecyl group, a 1-ethylnonyl group, a 1-butyleicosyl group, a 1-hexyloctadecyl group, a 1-octylhexadecyl group, a 1-decyltetradecyl group, a 1-undecyltridecyl group, or the like), a 2-alkylalkyl group (a 2-methylpropyl group (iso-butyl group), a 2-methylbutyl group, a 2-ethylpropyl group, a 2,2-dimethylpropyl group, a 2-methylpentyl group, a 2-ethylbutyl group, a 2-methylhexyl group, a 2-ethylpentyl group, a 2-methylheptyl group, a 2-ethylhexyl group, a 2-methyloctyl group, a 2-ethylheptyl group, a 2-methylnonyl group, a 2-ethyloctyl group, a 2-methyldecyl group, a 2-ethylnonyl group, a 2-hexyloctadecyl group, a 2-octylhexadecyl group, a 2-decyltetradecyl group, a 2-undecyltridecyl group, a 2-dodecylhexadecyl group, a 2-tridecylpentadecyl group, a 2-decyloctadecyl group, a 2-tetradecyloctadecyl group, a 2-hexadecyloctadecyl group, a 2-tetradecyleicosyl group, a 2-hexadecyleicosyl group, or the like), a 3 to 34-alkylalkyl group (a 3-alkylalkyl group, a 4-alkylalkyl group, a 5-alkylalkyl group, a 32-alkylalkyl group, a 33-alkylalkyl group, a 34-alkylalkyl group, or the like), and a mixed alkyl group containing one or more branched alkyl groups, such as an alkyl residue of an oxo alcohol corresponding to a propylene oligomer (heptamer to undecamer), an ethylene/propylene (molar ratio: 16/1 to 1/11) oligomer, an isobutylene oligomer (heptamer or octamer), an α-olefin (having 5 to 20 carbon atoms) oligomer (tetramer to octamer), or the like.

Among these groups, a methyl group, an ethyl group, and a 2-alkylalkyl group are preferable, and a 2-ethylhexyl group and a 2-decyltetradecyl group are more preferable from a viewpoint of liquid absorption of an electrolytic solution.

In addition to the vinyl monomer (b1) having a carboxyl group and the vinyl monomer (b2) represented by the above general formula (1), a monomer constituting a polymer may contain a copolymerizable vinyl monomer (b3) not containing active hydrogen.

Examples of the copolymerizable vinyl monomer (b3) not containing active hydrogen include the following (b31) to (b35).

(b31) Carbyl (Meth)Acrylate Formed from monool having 1 to 20 Carbon Atoms and (Meth)Acrylic Acid Examples of the monool include: (i) an aliphatic monool [methanol, ethanol, n- and i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, stearyl alcohol, or the like]; (ii) an alicyclic monool [cyclohexyl alcohol or the like]; and (iii) an araliphatic monool [benzyl alcohol or the like]; and a mixture of two or more kinds thereof.

(b32) Poly (n=2 to 30) Oxyalkylene (having 2 to 4 Carbon Atoms) Alkyl (having 1 to 18 Carbon Atoms) Ether (Meth) Acrylate [Methanol Ethylene Oxide (hereinafter abbreviated as EO) 10 mol Adduct (Meth)Acrylate, Methanol Propylene Oxide (hereinafter abbreviated as PO) 10 mol Adduct (Meth)Acrylate, or the Like]

(b33) Nitrogen-Containing Vinyl Compound (b33-1) Amide Group-Containing Vinyl Compound (i) a (meth)acrylamide compound having 3 to 30 carbon atoms, for example, N,N-dialkyl (having 1 to 6 carbon atoms) or diaralkyl (having 7 to 15 carbon atoms) (meth)acrylamide [N,N-dimethylacrylamide, N,N-dibenzylacrylamide, or the like], or diacetone acrylamide (ii) an amide group-containing vinyl compound having 4 to 20 carbon atoms excluding the above (meth)acrylamide compound, for example, N-methyl-N-vinylacetamide or a cyclic amide (pyrrolidone compound (having 6 to 13 carbon atoms, for example, N-vinyl pyrrolidone))

(b33-2) (Meth)Acrylate Compound (i) a diaralkyl (having 1 to 4 carbon atoms) aminoalkyl (having 1 to 4 carbon atoms) (meth)acrylate [N,N-dimethylaminoethyl (meth)acrylate, N,N-diethylaminoethyl (meth)acrylate, t-butylaminoethyl (meth)acrylate, morpholinoethyl (meth)acrylate, or the like]

(ii) a quaternary ammonium group-containing (meth)acrylate [quaternized compound of tertiary amino group-containing (meth)acrylate [N,N-dimethylaminoethyl (meth)acrylate, N,N-diethylaminoethyl (meth)acrylate, or the like] (compound quaternized with the above quaternizing agent), or the like]

(b33-3) Heterocyclic Ring-Containing Vinyl Compound

A pyridine compound (having 7 to 14 carbon atoms, for example, 2- and 4-vinyl pyridine), an imidazole compound (having 5 to 12 carbon atoms, for example, N-vinylimidazole), a pyrrole compound (having 6 to 13 carbon atoms, for example, N-vinylpyrrole), and a pyrrolidone compound (having 6 to 13 carbon atoms, for example, N-vinyl-2-pyrrolidone)

(b33-4) Nitrile Group-Containing Vinyl Compound

A nitrile group-containing vinyl compound having 3 to 15 carbon atoms, for example, (meth)acrylonitrile, cyanostyrene, and cyanoalkyl (having 1 to 4 carbon atoms) acrylate (b33-5) Other vinyl compounds A nitro group-containing vinyl compound (having 8 to 16 carbon atoms, for example, nitrostyrene) or the like (b34) Vinyl Hydrocarbon (b34-1) Aliphatic Vinyl Hydrocarbon An olefin having 2 to 18 or more carbon atoms [ethylene, propylene, butene, isobutylene, pentene, heptene, diisobutylene, octene, dodecene, octadecene, or the like], a diene having 4 to 10 or more carbon atoms [butadiene, isoprene, 1,4-pentadiene, 1,5-hexadiene, 1,7-octadiene, or the like], or the like (b34-2) Alicyclic Vinyl Hydrocarbon A cyclic unsaturated compound having 4 to 18 or more carbon atoms, for example, a cycloalkene (for example, cyclohexene), a (di)cycloalkadiene [for example, (di)cyclopentadiene], or a terpene (for example, pinene, limonene, or indene)

(b34-3) Aromatic Vinyl Hydrocarbon

An aromatic unsaturated compound having 8 to 20 or more carbon atoms, for example, styrene, α-methylstyrene, vinyltoluene, 2,4-dimethylstyrene, ethylstyrene, isopropylstyrene, butylstyrene, phenylstyrene, cyclohexylstyrene, or benzylstyrene (b35) Vinyl Ester, Vinyl Ether, Vinyl Ketone, and Unsaturated Dicarboxylic Acid Diester (b35-1) Vinyl Ester an aliphatic vinyl ester [an alkenyl ester having 4 to 15 carbon atoms, for example, an alkenyl ester of an aliphatic carboxylic acid (mono- or dicarboxylic acid) (for example, vinyl acetate, vinyl propionate, vinyl butyrate, diallyl adipate, isopropenyl acetate, or vinyl methoxy acetate)], and an aromatic vinyl ester [an alkenyl ester having 9 to 20 carbon atoms, for example, an alkenyl ester of an aromatic carboxylic acid (mono- or dicarboxylic acid) (for example, vinyl benzoate, diallyl phthalate, or methyl-4-vinyl benzoate), of an aromatic ring-containing ester of an aliphatic carboxylic acid (for example, acetoxystyrene)]

(b35-2) Vinyl Ether an aliphatic vinyl ether [having 3 to 15 carbon atoms, for example, a vinyl alkyl (having 1 to 10 carbon atoms) ether [vinyl methyl ether, vinyl butyl ether, vinyl 2-ethylhexyl ether, or the like)], a vinyl alkoxy (having 1 to 6 carbon atoms) alkyl (having 1 to 4 carbon atoms) ether [vinyl-2-methoxyethyl ether, methoxybutadiene, 3,4-dihydro-1,2-pyran, 2-butoxy-2'-vinyloxy diethyl ether, vinyl-2-ethyl mercaptoethyl ether, or the like], and a poly (2 to 4) (meth)allyloxyalkane (having 2 to 6 carbon atoms) [diallyloxyethane, triallyloxyethane, tetraallyloxybutane, tetramethallyloxyethane, or the like]]

Aromatic vinyl ether (having 8 to 20 carbon atoms, for example, vinyl phenyl ether or phenoxystyrene)

(b35-3) Vinyl Ketone

An aliphatic vinyl ketone (having 4 to 25 carbon atoms, for example, vinyl methyl ketone or vinyl ethyl ketone)

An aromatic vinyl ketone (having 9 to 21 carbon atoms, for example, vinyl phenyl ketone)

(b35-4) Unsaturated Dicarboxylic Acid Diester

An unsaturated dicarboxylic acid diester having 4 to 34 carbon atoms, for example, dialkyl fumarate (each of the two alkyl groups is a linear, branched, or alicyclic group having 1 to 22 carbon atoms) or a dialkyl maleate (each of the two alkyl groups is a linear, branched, or alicyclic group having 1 to 22 carbon atoms)

Among the compounds exemplified as the (b3), (b31), (b32), and (b33) are preferable, and methyl (meth)acrylate, ethyl (meth)acrylate, and butyl (meth)acrylate are more preferable among the compounds of (b31) from viewpoints of liquid absorption of an electrolytic solution and withstand voltage.

In a polymer, the contents of the vinyl monomer (b1) having a carboxyl group, the vinyl monomer (b2) represented by the above general formula (1), and the copolymerizable vinyl monomer (b3) not containing active hydrogen are preferably 0.1 to 80% by mass, 0.1 to 99.9% by mass, and 0 to 99.8% by mass based on the weight of the polymer, respectively.

With the content of a monomer within the above range, liquid absorption of an electrolytic solution is favorable.

The contents of (b1) to (b3) are more preferably 30 to 60% by mass, 5 to 60% by mass, and 5 to 80% by mass, and still more preferably 35 to 50% by mass, 15 to 45% by mass, and 20 to 60% by mass, respectively.

A lower limit of the number average molecular weight of a polymer is preferably 10,000, more preferably 15,000, particularly preferably 20,000, and most preferably 30,000. An upper limit thereof is preferably 2,000,000, more preferably 1,500,000, particularly preferably 1,000,000, and most preferably 800,000.

The number average molecular weight of a polymer can be determined by GPC (gel permeation chromatography) measurement under the following conditions.

Apparatus: Alliance GPC V2000 (manufactured by Waters Corporation)

Solvent: orthodichlorobenzene

Standard material: polystyrene

Sample concentration: 3 mg/ml

Column stationary phase: PLgel 10 μm, two MIXED-B in series (manufactured by Polymer Laboratories)

Column temperature: 135° C.

A solubility parameter (SP value) of a polymer is preferably 9.0 to 20.0 $(cal/cm^3)^{1/2}$. The SP value of a polymer is more preferably 9.5 to 18.0 $(cal/cm^3)^{1/2}$, and still more preferably 10.0 to 14.0 $(cal/cm^3)^{1/2}$. The SP value of a polymer of 9.0 to 20.0 $(cal/cm^3)^{1/2}$ is preferable in terms of liquid absorption of an electrolytic solution.

The glass transition point (hereinafter abbreviated as Tg, measurement method: DSC (scanning differential thermal analysis) method)] of a polymer is preferably 80 to 200° C., more preferably 90 to 190° C., and particularly preferably 100 to 180° C. from a viewpoint of heat resistance of the battery.

A polymer can be manufactured by a known polymerization method (bulk polymerization, solution polymerization, emulsion polymerization, suspension polymerization, or the like).

The coating resin preferably has moderate flexibility in a state of being immersed in an electrolytic solution. Specifically, the tensile elongation at break of the coating resin in a saturated liquid absorbing state is preferably 10% or more, more preferably 20% or more, still more preferably 30% or more, particularly preferably 40% or more, and most preferably 50% or more. By coating the negative electrode active material with a resin having a tensile elongation at break of 10% or more, it is possible to relax a volume change of the negative electrode active material due to a charge/discharge reaction and to suppress expansion of the electrode. Incidentally, in this specification, the "tensile elongation at break" is an index indicating flexibility of a resin, and is a value obtained by a measuring method described in the column of Examples described later. A larger value of the tensile elongation at break of the coating resin is more preferable. An upper limit value thereof is not particularly limited, but is usually 400% or less, and preferably 300% or less. That is, a preferable range of a numerical value of the tensile elongation at break is 10 to 400%, 20 to 400%, 30 to 400%, 40 to 400%, 50 to 400%, 10 to 300%, 20 to 300%, 30 to 300%, 40 to 300%, or 50 to 300%.

Examples of a method for imparting flexibility to the coating resin and controlling the tensile elongation at break to a desired value include a method for introducing a flexible partial structure (for example, a long chain alkyl group, a polyether residue, an alkyl polycarbonate residue, an alkyl polyester residue, or the like) into a main chain of the coating resin. It is also possible to adjust the tensile elongation at break by imparting flexibility to the coating resin by controlling the molecular weight of the coating resin or controlling a molecular weight between crosslinks.

(Conductive Aid)

By forming an electron conduction path in the coating agent and reducing electron transfer resistance of the negative electrode active material layer, a conductive aid can contribute to improvement of output characteristics of the battery at a high rate.

Examples of the conductive aid include: a metal such as aluminum, stainless steel (SUS), silver, gold, copper, or titanium, and an alloy or a metal oxide containing these metals; and a carbon such as graphite, a carbon fiber (specifically, vapor-grown carbon fiber (VGCF) or the like), carbon nanotube (CNT), or carbon black (specifically, acetylene black, Ketjen black (registered trademark), furnace black, channel black, thermal lamp black, or the like), but are not limited thereto. In addition, a material obtained by coating a periphery of a particulate ceramic material or a resin material with the metal material by plating or the like can also be used as the conductive aid. Among these conductive aids, a material containing at least one selected from the group consisting of aluminum, stainless steel, silver, gold, copper, titanium, and carbon is preferable, a material containing at least one selected from the group consisting of aluminum, stainless steel, silver, gold, and carbon is more preferable, and a material containing at least one kind of carbon is still more preferable from a viewpoint of electrical stability. These conductive aids may be used singly or in combination of two or more kinds thereof.

The shape of the conductive aid is preferably particulate or fibrous. In a case where the conductive aid is particulate, the shape of a particle is not particularly limited, and may be in any shape such as a powdery shape, a spherical shape, a rod shape, a needle shape, a plate shape, a column shape, an amorphous shape, a flake shape, or a spindle shape.

An average particle diameter (primary particle diameter) in a case where the conductive aid is particulate is not particularly limited, but is preferably about 0.01 to 10 μm from a viewpoint of electrical characteristics of the battery. Note that, in this specification, "particle diameter" means a maximum distance L among distances between any two points on a contour line of the conductive aid. As a value of the "average particle diameter", a value calculated as an average value of particle diameters of particles observed in several to several tens visual fields using an observation means such as a scanning electron microscope (SEM) or a transmission electron microscope (TEM) is adopted.

The contents of the coating resin and the conductive aid in the coating agent are not particularly limited, but coating resin (resin solid content):conductive aid=1:0.2 to 3.0 (mass ratio) is preferably satisfied. Within such a range, the conductive aid can form an electron conduction path favorably in the coating agent.

(Method for Manufacturing Coated Negative Electrode Active Material Particles)

A method for manufacturing coated negative electrode active material particles is not particularly limited, but examples thereof include the following methods. First, a negative electrode active material is put in a universal mixer. While the negative electrode active material is stirred at 10 to 500 rpm, a solution (coating resin solution) containing a coating resin and a solvent is dropwise added and mixed over 1 to 90 minutes. As the solvent in this case, an alcohol such as methanol, ethanol, or isopropanol can be suitably used. Thereafter, a conductive aid is further added and mixed. Then, the temperature is raised to 50 to 200° C. while stirring is continued, the pressure is reduced to 0.007 to 0.04 MPa, and then the solution is held for 10 to 150 minutes to obtain coated negative electrode active material particles.

(Conductive Member)

In the present embodiment, the conductive member has a function of forming an electron conduction path in the negative electrode active material layer. Particularly, at least a part of the conductive member preferably forms a conductive path for electrically connecting a first main surface in contact with an electrolytic layer side of the negative electrode active material layer to a second main surface in contact with a current collector side. Such a form further reduces electron transfer resistance in the negative electrode active material layer in a thickness direction, and therefore can further improve output characteristics of the battery at a high rate. Note that whether or not at least a part of the conductive member forms a conductive path for electrically connecting a first main surface in contact with an electrolytic layer side of the negative electrode active material layer to a second main surface in contact with a current collector side can be confirmed by observing a cross section of the negative electrode active material layer using an SEM or an optical microscope.

The conductive member is preferably a conductive fiber having a fibrous shape. Specific examples thereof include: a carbon fiber such as a PAN-based carbon fiber or a pitch-based carbon fiber; a conductive fiber obtained by uniformly dispersing a metal or graphite having good conductivity in a synthetic fiber; a metal fiber obtained by fibrillizing a metal such as stainless steel; a conductive fiber obtained by coating a surface of an organic fiber with a metal; and a conductive fiber obtained by coating a surface of an organic fiber with a resin containing a conductive material. Among these fibers, a carbon fiber is preferable because of having excellent conductivity and light weight.

The content of the conductive member in the negative electrode active material layer is preferably 1 to 20% by mass, and more preferably 2 to 15% by mass with respect to 100% by mass of the total solid content of the negative electrode active material layer (total solid content of all members). When the content of the conductive member is within the above range, an electron conduction path can be formed favorably in the negative electrode active material layer, and reduction in energy density of the battery can be suppressed.

(Ion Conductive Polymer)

Examples of the ion conductive polymer include a polyethylene oxide (PEO)-based polymer and a polypropylene oxide (PPO)-based polymer.

(Lithium Salt)

Examples of the lithium salt (supporting salt) include a lithium salt of an inorganic acid, such as $LiPF_6$, $LiBF_4$, $LiSbF_6$, $LiAsF_6$, or $LiClO_4$, a lithium salt of an organic acid, such as $LiN(CF_3SO_2)_2$, $LiN(C_2F_5SO_2)_2$, or $LiC(CF_3SO_2)_3$, and the like. Among these salts, $LiPF_6$ is preferable from a viewpoint of battery output and charge/discharge cycle characteristics.

Note that, in the bipolar secondary battery of the present embodiment, as a constituent member of the negative electrode active material layer, a member other than the above negative electrode active material, coating agent (coating resin and conductive aid), an optionally used conductive member, an optionally used ion conductive polymer, and an optionally used lithium salt may be appropriately used. However, the bipolar secondary battery preferably contains no member that does not significantly contribute to progress of a charge/discharge reaction from a viewpoint of improving the energy density of the battery. For example, it is preferable to prevent use of a binder added in order to bind the coated negative electrode active material particles to another member to maintain the structure of the negative electrode active material layer as much as possible. Specifically, the content of the binder is preferably 1% by mass or less, more preferably 0.5% by mass or less, still more preferably 0.2% by mass or less, particularly preferably 0.1% by mass or less, and most preferably 0% by mass with respect to 100% by mass of the total solid content contained in the negative electrode active material layer. Note that the binder is preferably made of a material having low flexibility from a viewpoint of maintaining the structure of the negative electrode active material layer. Specifically, the tensile elongation at break of the binder in a saturated liquid absorbing state is preferably less than 10%, more preferably 7% or less, still more preferably 5% or less, particularly preferably 3% or less, and most preferably 1% or less.

In the bipolar secondary battery of the present embodiment, the thickness of the negative electrode active material layer is essentially 150 to 1500 μm preferably 180 to 1200 μm, and more preferably 200 to 1000 μm. When the thickness of the negative electrode active material layer is less than 150 μm, the energy density of the battery cannot be sufficiently increased. Meanwhile, when the thickness of the negative electrode active material layer exceeds 1500 μm the structure of the negative electrode active material layer cannot be sufficiently maintained.

The porosity of the negative electrode active material layer is essentially 39.0 to 60.0%, preferably 39.5 to 55.0%, and more preferably 40.0 to 50.0%. In a case of manufacturing the negative electrode active material layer by a method for manufacturing a negative electrode active material layer described later, in order to make the porosity less than 39.0%, when a coating film is pressed after a negative electrode active material layer slurry is applied, a pressing pressure needs to be large. However, when the pressing pressure is large, the coating film is crushed, and it is difficult to form a negative electrode active material layer having a desired thickness and area. Therefore, the large pressing pressure is not preferable. Meanwhile, when the porosity exceeds 60.0%, it is impossible to maintain contact between the electron conductive materials (conductive aid, negative electrode active material, conductive member, or the like) in the negative electrode active material layer, and electron transfer resistance may be increased. As a result, a charge/discharge reaction does not proceed uniformly in the entire negative electrode active material layer (particularly in a thickness direction), and output characteristics (particularly output characteristics at a high rate) of the battery may be lowered. Note that, in this specification, as the porosity of the negative electrode active material layer, a value measured by a method described in Examples described later is adopted.

The density of the negative electrode active material layer is essentially 0.60 to 1.20 $g/cm^3$, preferably 0.70 to 1.00 $g/cm^3$, and more preferably 0.80 to 0.91 $g/cm^3$. When the density is less than 0.60 $g/cm^3$, the density of the negative electrode active material is low, and it may be impossible to obtain a battery having a sufficient energy density. Meanwhile, when the density exceeds 1.20 $g/cm^3$, the porosity of the above-described negative electrode active material layer may be small. As the porosity decreases, the electrolytic solution filling voids decreases, and therefore ion transfer resistance in the negative electrode active material layer can increase. As a result, output characteristics (particularly, output characteristics at a high rate) of the battery may be lowered. Note that, in this specification, as the density of the negative electrode active material layer, a value measured by a method described in Examples described later is adopted.

(Method for Manufacturing Negative Electrode)

A method for manufacturing a negative electrode is not particularly limited, and the negative electrode can be manufactured by appropriately referring to a conventionally known method. However, as described above, in the present embodiment, the content of a member that does not significantly contribute to progress of a charge/discharge reaction is preferably minimized in the negative electrode active material layer from a viewpoint of improving the energy density of the battery. Therefore, as a preferable embodiment of the manufacturing method, a method for manufacturing a negative electrode containing only a small amount of a binder (or containing no binder) in the negative electrode active material layer will be described below.

That is, a method for manufacturing a negative electrode according to an embodiment of the present invention includes: step (1) of mixing coated negative electrode active material particles in which at least a part of a surface of a negative electrode active material is coated with a coating agent containing a coating resin and a conductive aid with an electrolytic solution to prepare a negative electrode active material layer slurry; step (2) of applying the negative electrode active material layer slurry to a surface of a current collector; and step (3) of disposing a porous sheet on the negative electrode active material layer slurry applied in the step (2) and pressing the porous sheet. Hereinafter, each of the steps will be described in detail.

In step (1), coated negative electrode active material particles in which at least a part of a surface of a negative electrode active material is coated with a coating agent containing a coating resin and a conductive aid are mixed with an electrolytic solution to prepare a negative electrode active material layer slurry.

Here, the method for mixing coated negative electrode active material particles with an electrolytic solution to prepare a negative electrode active material layer slurry is not particularly limited, and conventionally known knowledge on the addition order of the members, a mixing method, or the like is appropriately referred to. Here, the electrolytic solution may have the same composition as the electrolytic solution contained in the electrolytic layer of the battery, or may have a different composition therefrom, but preferably has the same composition from a viewpoint of simplification in a manufacturing process due to omitting a drying step. In addition to the coated negative electrode active material particles and the electrolytic solution, a conductive aid, an ion conductive polymer, a lithium salt, a small amount of a binder, or the like may be added as necessary. Incidentally, as described above, the content of the binder is preferably 1% by mass or less, more preferably 0.5% by mass or less, still more preferably 0.2% by mass or less, particularly preferably 0.1% by mass or less, and most preferably 0% by mass with respect to 100% by mass of the total solid content contained in the negative electrode active material layer.

The concentration of the negative electrode active material layer slurry is not particularly limited. However, the concentration of the total solid content is preferably 35 to 75% by mass, more preferably 40 to 70% by mass, and still more preferably 45 to 60% by mass with respect to 100% by mass of the negative electrode active material layer slurry from a viewpoint of facilitating the application in step (2) and pressing in step (3). With the concentration within the above range, a negative electrode active material layer having a sufficient thickness can be easily formed by the application in step (2), and the porosity and the density are easily adjusted by pressing in step (3).

In step (2), the negative electrode active material layer slurry prepared in step (1) is applied to a surface of a current collector. An application method is not particularly limited, and conventionally known knowledge is appropriately referred to.

By the manufacturing method of the present embodiment, a battery can be manufactured without particularly drying the negative electrode active material layer slurry after the negative electrode active material layer slurry is applied. Therefore, it is difficult to cut out a negative electrode so as to have a desired area after the negative electrode active material layer slurry is applied. Therefore, in this step, it is necessary to apply the negative electrode active material layer slurry to a surface of a current collector so as to have a desired area. For this purpose, the surface of the current collector other than an application portion may be subjected to a masking treatment or the like in advance.

In step (3), a porous sheet is disposed on the negative electrode active material layer slurry (coating film) applied in step (2) and pressed.

The porous sheet is used for preventing the negative electrode active material layer slurry from adhering to a pressing apparatus when the slurry is pressed and for absorbing an extra electrolytic solution exuded when the slurry is pressed. Therefore, the material and form of the porous sheet are not particularly limited as long as being able to achieve the above object.

For example, as the porous sheet, those similar to a microporous film, a nonwoven fabric, or the like used as a separator in the present technical field can be used. Specific examples of the microporous film include a microporous film made of a hydrocarbon-based resin such as polyimide, aramid, or polyvinylidene fluoride-hexafluoropropylene (PVDF-HFP), a glass fiber, or the like. Examples of the nonwoven fabric include a nonwoven fabric using cotton, rayon, acetate, nylon, polyester, a polyolefin such as PP or PE, polyimide, aramid, or the like singly or in combination thereof.

Note that the porous sheet may be removed after pressing or may be used as a separator of a battery as it is. In a case where the porous sheet is used as it is as a separator after pressing, an electrolytic layer may be formed using only the porous sheet as a separator, or an electrolytic layer may be formed by combining the porous sheet with another separator (that is, using two or more separators).

The pressing apparatus of step (3) is preferably an apparatus capable of uniformly applying pressure to the entire surface of the applied negative electrode active material layer slurry. Specifically, a high pressure jack J-1 (manufactured by AS ONE Corporation) can be used. The pressure at the time of pressing is not particularly limited, but is preferably 5 to 40 MPa, more preferably 10 to 35 MPa, and still more preferably 12 to 30 MPa. With the pressure within the above range, a negative electrode active material layer whose porosity is 39.0 to 60.0% and whose density is 0.60 to 1.20 g/cm$^3$ can be achieved.

[Positive Electrode Active Material Layer]

In the present invention, as long as the positive electrode active material layer contains a positive electrode active material, the other forms are not particularly limited, and conventionally known knowledge is appropriately referred to.

However, according to a preferable embodiment of the present invention, the positive electrode active material layer also preferably has a similar form to the above-described negative electrode active material layer. That is, the positive electrode active material layer preferably contains a positive electrode active material and a coating agent for coating a surface of the positive electrode active material. In other words, the positive electrode active material layer preferably contains coated positive electrode active material particles in which at least a part of a surface of a positive electrode active material is coated with a coating agent containing a coating resin and a conductive aid. In addition, the positive electrode active material layer may contain a conductive member, an ion conductive polymer, a lithium salt, and the like as necessary.

Note that, in this specification, a positive electrode active material in a state coated with a coating agent is also referred to as "coated positive electrode active material particles". The coated positive electrode active material particles have a core-shell structure in which a shell portion made of a coating agent containing a coating resin and a conductive aid is formed on a surface of a core portion made of a positive electrode active material.

Note that the embodiment of the positive electrode active material layer containing the coated positive electrode active material particles is basically similar to the contents described in the section of "negative electrode active material layer" except for a material of the positive electrode active material. Therefore, detailed description thereof will be omitted here.

(Positive Electrode Active Material)

Examples of the positive electrode active material include a lithium-transition metal composite oxide such as $LiMn_2O_4$, $LiCoO_2$, $LiNiO_2$, $Li(Ni-Mn-Co)O_2$, or a compound in which some of atoms of these transition metals are replaced by atoms of other elements, a lithium-transition metal phosphate compound, a lithium-transition metal sulfate compound, and the like. Two or more positive electrode active materials may be used in combination in some cases. The lithium-transition metal composite oxide is preferably used as the positive electrode active material from a viewpoint of capacity and output characteristics. A composite oxide containing lithium and nickel is more preferably used. $Li(Ni-Mn-Co)_2$ and a compound in which some of atoms of these transition metals are replaced by atoms of other elements (hereinafter also simply referred to as "NMC composite oxide"), lithium-nickel-cobalt-aluminum composite oxide (hereinafter also simply referred to as "NCA composite oxide"), or the like is more preferably used. The NMC composite oxide has a layered crystal structure in which a lithium atom layer and a transition metal (Mn, Ni, and Co are orderly arranged) atomic layer are alternately laminated through an oxygen atom layer. One Li atom is contained per atom of a transition metal M. The amount of Li that can be taken out is twice that of a spinel type lithium manganese oxide, that is, supply capacity is doubled, and the capacity can be high.

As described above, the NMC composite oxide also includes a composite oxide in which some of atoms of a transition metal element are replaced by atoms of other elements. Examples of the other elements in this case include Ti, Zr, Nb, W, P, Al, Mg, V, Ca, Sr, Cr, Fe, B, Ga, In, Si, Mo, Y, Sn, V, Cu, Ag, Zn, and the like. Ti, Zr, Nb, W, P, Al, Mg, V, Ca, Sr, and Cr are preferable, and Ti, Zr, P, Al, Mg, and Cr are more preferable. Ti, Zr, Al, Mg, and Cr are still more preferable from a viewpoint of improving cycle characteristics.

The NMC composite oxide has high theoretical discharge capacity, and therefore preferably has a composition represented by general formula (1): $Li_aNi_bMn_cCo_dM_xO_2$ (wherein a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M is at least one element selected from the group consisting of Ti, Zr, Nb, W, P, Al, Mg, V, Ca, Sr, and Cr). Here, a represents the atomic ratio of Li, b represents the atomic ratio of Ni, c represents the atomic ratio of Mn, d represents the atomic ratio of Co, and x represents the atomic ratio of M. In general formula (1), $0.4 \leq b \leq 0.6$ is preferably satisfied from a viewpoint of cycle characteristics. Note that the composition of each element can be measured by, for example, inductively coupled plasma (ICP) emission spectrometry.

In general, it is known that nickel (Ni), cobalt (Co), and manganese (Mn) contribute to capacity and output characteristics from viewpoints of improving purity of a material and improving electron conductivity. Some of atoms of a transition metal in a crystal lattice are replaced by atoms of Ti and the like. Some of atoms of a transition metal element are preferably replaced by atoms of other elements from a viewpoint of cycle characteristics, and $0 < x \leq 0.3$ is particularly preferably satisfied in general formula (1). Due to solid solution of at least one selected from the group consisting of Ti, Zr, Nb, W, P, Al, Mg, V, Ca, Sr, and Cr, the crystal structure is stabilized. Therefore, as a result, it is considered that reduction in capacity of the battery can be prevented even after repeated charge/discharge, and excellent cycle characteristics can be achieved.

As a more preferable embodiment, in general formula (1), b, c, and d preferably satisfy $0.44 \leq b \leq 0.51$, $0.27 \leq c \leq 0.31$, and $0.19 \leq d \leq 0.26$ from a viewpoint of improving a balance between capacity and life characteristics. For example, $LiNi_{0.5}Mn_{0.3}Co_{0.2}O_2$ has larger capacity per unit weight than $LiCoO_2$, $LiMn_2O_4$, $LiNi_{1/3}Mn_{1/3}Co_{1/3}O_2$, or the like which has been proven to be satisfactory in a general consumer-use battery. This makes it possible to improve the energy density and brings about an advantage that a compact and high capacity battery can be manufactured, and therefore is preferable also from a viewpoint of a cruising distance. Note that $LiNi_{0.8}Co_{0.1}Al_{0.1}O_2$ is more advantageous in terms of larger capacity, but has a problem in life characteristics. In contrast, $LiNi_{0.5}Mn_{0.3}Co_{0.2}O_2$ has excellent life characteristics similar to $LiNi_{1/3}Mn_{1/3}Co_{1/3}O_2$.

Incidentally, of course, a positive electrode active material other than the above materials may be used. The average particle diameter of the positive electrode active material is not particularly limited, but is preferably 1 to 100 μm, and more preferably 1 to 20 μm from a viewpoint of high output.

[Electrolytic Layer]

An electrolyte used in the electrolytic layer of the present embodiment is not particularly limited, and a liquid electrolyte, a gel polymer electrolyte, or an ionic liquid electrolyte is used without limitation. By using these electrolytes, high lithium ion conductivity can be secured.

The liquid electrolyte has a function as a carrier of a lithium ion. The liquid electrolyte constituting an electrolytic solution layer has a form in which a lithium salt is dissolved in an organic solvent. Examples of the organic solvent to be used include a carbonate such as ethylene carbonate (EC), propylene carbonate (PC), dimethyl carbonate (DMC), diethyl carbonate (DEC), or ethyl methyl carbonate. As the lithium salt, a compound that can be added to an active material layer of an electrode, such as $Li(C_2F_5SO_2)_2N$, $LiPF_6$, $LiBF_4$, $LiClO_4$, $LiAsF_6$, or $LiCF_3SO_3$, can be adopted similarly. The liquid electrolyte may further contain an additive other than the above-described components. Specific examples of such a compound include vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxy methylethylene carbonate, propargyloxy ethylene carbonate, methylene ethylene carbonate, 1,1-dimethyl-2-methylene ethylene carbonate, and the like. Among these compounds, vinylene carbonate, methyl vinylene carbonate, and vinyl ethylene carbonate are preferable, and vinylene carbonate and vinyl ethylene carbonate are more preferable. These cyclic carbonates may be used singly or in combination of two or more kinds thereof.

The gel polymer electrolyte has a configuration in which the liquid electrolyte is injected into a matrix polymer (host polymer) made of an ion conductive polymer. Use of the gel polymer electrolyte as an electrolyte is advantageous in that fluidity of the electrolyte is lost and ionic conductivity between layers is easily blocked. Examples of the ion conductive polymer used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene PVDF-HEP), polymethyl methacrylate (PMMA), copolymers thereof, and the like.

The matrix polymer of the gel polymer electrolyte can exhibit excellent mechanical strength by forming a crosslinked structure. In order to form the crosslinked structure, using an appropriate polymerization initiator, a polymerizable polymer for forming a polymer electrolyte (for example, PEO or PPO) is only required to be subjected to a polymerization treatment such as thermal polymerization, ultraviolet polymerization, radiation polymerization, or electron beam polymerization.

The ionic liquid electrolyte is obtained by dissolving a lithium salt in an ionic liquid. Note that the ionic liquid refers to a series of compounds that are salts each made of only a cation and an anion and liquid at room temperature.

The cation component constituting the ionic liquid is preferably at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted thoriadinium ion, and a substituted or unsubstituted ammonium ion.

Specific examples of the anion component constituting the ionic liquid include a halide ion such as a fluoride ion, a chloride ion, a bromide ion, or an iodide ion, a nitrate ion ($NO_3^-$), a tetrafluoroborate ion ($BF_4^-$), a hexafluorophosphate ion ($PF_6^-$), ($FSO_2$)$_2N^-$, $AlCl_3^-$, a lactate ion, an acetate ion ($CH_3COO^-$), a trifluoroacetate ion ($CF_3COO^-$), a methanesulfonate ion ($CH_3SO_3^-$), a trifluoromethane sulfonate ion ($CF_3SO_3^-$), a bis(trifluoromethanesulfonyl) imide ion (($CF_3SO_2$)$_2N^-$), a bis(pentafluoroethylsulfonyl) imide ion (($C_2F_5SO_2$)$_2N^-$), $BF_3C_2F_5^-$, a tris(trifluoromethanesulfonyl) carbonate ion (($CF_3SO_2$)$_3C^-$), a perchlorate ion ($ClO_4^-$), a dicyanamide ion (($CN$)$_2N^-$), an organic sulfate ion, an organic sulfonate ion, $R^1COO^-$, $HOOCR^1COO^-$, $^-OOCR^1COO^-$, and $NH_2CHR^1COO^-$ (in this case, $R^1$ represents a substituent that is an aliphatic hydrocarbon group, an alicyclic hydrocarbon group, an aromatic hydrocarbon group, an ether group (when $R^1$ represents a divalent group), an ester group, or an acyl group, and the substituent may contain a fluorine atom).

Preferable examples of the ionic liquid include 1-methyl-3-methylimidazolium bis(trifluoromethanesulfonyl) imide and N-methyl-N-propylpyrrolidium bis(trifluoromethanesulfonyl) imide. These ionic liquids may be used singly or in combination of two or more kinds thereof.

The lithium salt used for the ionic liquid electrolyte is similar to a lithium salt used for the above-described liquid electrolyte. Note that the concentration of the lithium salt is preferably 0.1 to 2.0 M, and more preferably 0.8 to 1.2 M.

The following additives may be added to the ionic liquid. By inclusion of an additive, charge/discharge characteristics at a high rate and cycle characteristics can be further improved. Specific examples of the additive include vinylene carbonate, ethylene carbonate, propylene carbonate, γ-butyrolactone, γ-valerolactone, methyl diglyme, sulfolane, trimethyl phosphate, triethyl phosphate, methoxymethylethyl carbonate, fluorinated ethylene carbonate, and the like. These compounds may be used singly or in combination of two or more kinds thereof. The amount of the additive to be used is preferably 0.5 to 10% by mass, and more preferably 0.5 to 5% by mass with respect to the ionic liquid.

In the bipolar secondary battery of the present embodiment, a separator may be used for the electrolytic layer. The separator has a function of maintaining an electrolyte to ensure lithium ion conductivity between a positive electrode and a negative electrode and a function as a partition wall between the positive electrode and the negative electrode. Particularly, when a liquid electrolyte or an ionic liquid electrolyte is used as an electrolyte, a separator is preferably used.

Examples of a form of the separator include a porous sheet separator, a nonwoven fabric separator, and the like, made of a polymer or a fiber that absorbs and holds the electrolyte.

As the porous sheet separator made of a polymer or a fiber, for example, a microporous (microporous film) separator can be used. Specific examples of the porous sheet made of a polymer or a fiber include a microporous (microporous film) separator made of a hydrocarbon-based resin such as a polyolefin including polyethylene (PE), polypropylene (PP), and the like, a laminate obtained by laminating a plurality of these polyolefins (for example, a laminate having a three-layer structure of PP/PE/PP), polyimide, aramid, or polyvinylidene fluoride-hexafluoropropylene (PVDF-HFP), a glass fiber, or the like.

The thickness of the microporous (microporous film) separator cannot be unequivocally defined because the thickness varies depending on an intended use. For example, the thickness of a separator used for, for example, a motor-driving secondary battery such as an electric vehicle (EV), a hybrid electric vehicle (HEV), or a fuel cell vehicle (FCV) is desirably 4 to 60 μm in a single layer or multiple layers. The microporous (microporous film) separator desirably has a fine pore diameter of 1 μm at maximum (usually having a pore diameter of about several tens nm).

Examples of the nonwoven fabric include a nonwoven fabric using a conventionally known material such as cotton, rayon, acetate, nylon, polyester, a polyolefin such as PP or PE, polyimide, or aramid singly or in combination thereof. The bulk density of the nonwoven fabric should not be particularly limited as long as sufficient battery characteristics can be obtained by a polymer gel electrolyte with which the nonwoven fabric is impregnated. Furthermore, the thickness of the nonwoven fabric separator only needs to be the same as that of the electrolytic layer, and is preferably 5 to 200 μm, and particularly preferably 10 to 100 μm.

It is also preferable to use a laminate obtained by laminating a heat-resistant insulating layer on the above-described microporous (microporous film) separator or nonwoven fabric separator as a resin porous substrate layer (separator with heat-resistant insulating layer). The heat-resistant insulating layer is a ceramic layer containing inorganic particles and a binder. As the separator with a heat-resistant insulating layer, a separator having high heat resistance which has a melting point or thermal softening point of 150° C. or higher, preferably 200° C. or higher is used. Presence of the heat-resistant insulating layer relaxes an internal stress of the separator which increases as the temperature rise, and therefore a heat shrinkage-suppressing effect can be obtained. As a result, induction of a short circuit between electrodes of a battery can be prevented, and therefore the battery hardly lowers performance due to rise in the temperature. In addition, the presence of the heat-resistant insulating layer improves a mechanical strength of the separator with the heat-resistant insulating layer, and hardly breaks a film of the separator. Furthermore, the separator is hardly curled in a process for manufacturing a battery due to the heat shrinkage-suppressing effect and the high mechanical strength.

The inorganic particles in the heat-resistant insulating layer contribute to the mechanical strength of the heat-resistant insulating layer and the heat shrinkage-suppressing effect. A material used as the inorganic particles is not particularly limited. Examples thereof include oxides of silicon, aluminum, zirconium, and titanium ($SiO_2$, $Al_2O_3$, $ZrO_2$, and $TiO_2$), a hydroxide, a nitride, and complexes thereof. These inorganic particles may be derived from mineral resources such as boehmite, zeolite, apatite, kaoline, mullite, spinel, olivine, or mica, or may be artificially manufactured. These inorganic particles may be used singly or in combination of two or more kinds thereof. Among these inorganic particles, silica ($SiO_2$) or alumina ($Al_2O_3$) is preferably used, and alumina ($Al_2O_3$) is more preferably used from a viewpoint of cost.

The weight per unit area of the inorganic particles is not particularly limited, but is preferably 5 to 15 g/m². The weight per unit area within this range is preferable in terms of obtaining sufficient ion conductivity and maintaining heat-resistant strength.

The binder in the heat-resistant insulating layer binds inorganic particles to each other, or binds the inorganic particles to a resin porous substrate layer. The binder forms the heat-resistant insulating layer stably, and prevents peeling between the resin porous substrate layer and the heat-resistant insulating layer.

The binder used in the heat-resistant insulating layer is not particularly limited. Examples thereof include a compound such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), or methyl acrylate. Among these compounds, carboxymethyl cellulose (CMC), methyl acrylate, or polyvinylidene fluoride (PVDF) is preferably used. These compounds may be used singly or in combination of two or more kinds thereof.

The content of the binder in the heat-resistant insulating layer is preferably 2 to 20% by mass with respect to 100% by mass of the heat-resistant insulating layer. When the content of the binder is 2% by mass or more, the peeling strength between the heat-resistant insulating layer and the porous substrate layer can be enhanced, and vibration resistance of the separator can be improved. Meanwhile, when the content of the binder is 20% by mass or less, a gap between the inorganic particles can be maintained properly, and therefore sufficient lithium ion conductivity can be secured.

The heat shrinkage of the separator with a heat-resistant insulating layer is preferably 10% or less in MD and TD after the separator is held under conditions of 150° C. and 2 gf/cm$^2$ for one hour. By using such a highly heat-resistant material, the heat generation amount is increased, and shrinkage of the separator can be prevented effectively even when the temperature in a battery reaches 150° C. As a result, induction of a short circuit between electrodes of a battery can be prevented, and therefore the battery hardly lowers performance due to rise in the temperature.

[Positive Electrode Current Collecting Plate and Negative Electrode Current Collecting Plate]

A material for forming the current collecting plates (25 and 27) is not particularly limited, and a known highly conductive material conventionally used for a current collecting plate for a lithium ion secondary battery can be used. Preferable examples of the material constituting the current collecting plate include a metal material such as aluminum, copper, titanium, nickel, stainless steel (SUS), or an alloy thereof. Aluminum and copper are more preferable, and aluminum is particularly preferable from viewpoints of light weight, corrosion resistance, and high conductivity. Note that the same material or different materials may be used for the positive electrode current collecting plate 25 and the negative electrode current collecting plate 27.

[Positive Electrode Lead and Negative Electrode Lead]

Although not illustrated, the current collector 11 may be electrically connected to the current collecting plates (25 and 27) through a positive electrode lead or a negative electrode lead. As a material constituting the positive electrode and negative electrode leads, a material used in a known lithium ion secondary battery can be similarly adopted. Note that a portion taken out of an exterior material is preferably coated with a heat resistant and insulating heat-shrinkable tube or the like such that the portion has no influence on a product (for example, an automobile component, particularly an electronic device or the like) by electric leak due to contact with neighboring devices, wiring, or the like.

[Sealing Portion]

The sealing portion (insulating layer) has a function of preventing contact between current collectors and short circuit at an end of a unit battery layer. A material constituting the sealing portion may be any material as long as having an insulating property, a sealing property against falling off of a solid electrolyte, a sealing property against moisture permeation from the outside, heat resistance under a battery operating temperature, and the like. Examples of the material include an acrylic resin, a urethane resin, an epoxy resin, a polyethylene resin, a polypropylene resin, a polyimide resin, a rubber (ethylene-propylene-diene rubber: EPDM), and the like. An isocyanate-based adhesive, an acrylic resin-based adhesive, a cyanoacrylate-based adhesive, or the like may be used, and a hot melt adhesive (a urethane resin, a polyamide resin, or a polyolefin resin) or the like may be used. Among these materials, a polyethylene resin and a polypropylene resin are preferably used as a material constituting an insulating layer from viewpoints of corrosion resistance, chemical resistance, manufacturing easiness (film-forming property), economic efficiency, and the like. A resin mainly containing an amorphous polypropylene resin and obtained by copolymerizing ethylene, propylene, and butene is preferably used.

[Battery Exterior Body]

As the battery exterior body, a known metal can case can be used. In addition, a bag-like case using the laminate film 29 containing aluminum, capable of coating a power generating element as illustrated in FIG. 1, can be used. For the laminate film, for example, a laminate film having a three-layer structure obtained by laminating PP, aluminum, and nylon in this order, or the like can be used, but the laminate film is not limited thereto. A laminate film is desirable from a viewpoint of being able to be suitably used for a large device battery for EV or HEV because of high output and excellent cooling performance. In addition, the exterior body is more preferably an aluminum laminate because a group pressure to a power generating element applied from the outside can be easily adjusted, and the thickness of an electrolytic solution layer can be easily adjusted to a desired thickness.

In the bipolar secondary battery of the present embodiment, by inclusion of the above-described negative electrode for non-aqueous electrolyte secondary battery, output characteristics at a high rate can be improved. Therefore, the bipolar secondary battery of the present embodiment is suitably used as a power source for driving EV and HEV.

[Cell Size]

Figure 2:
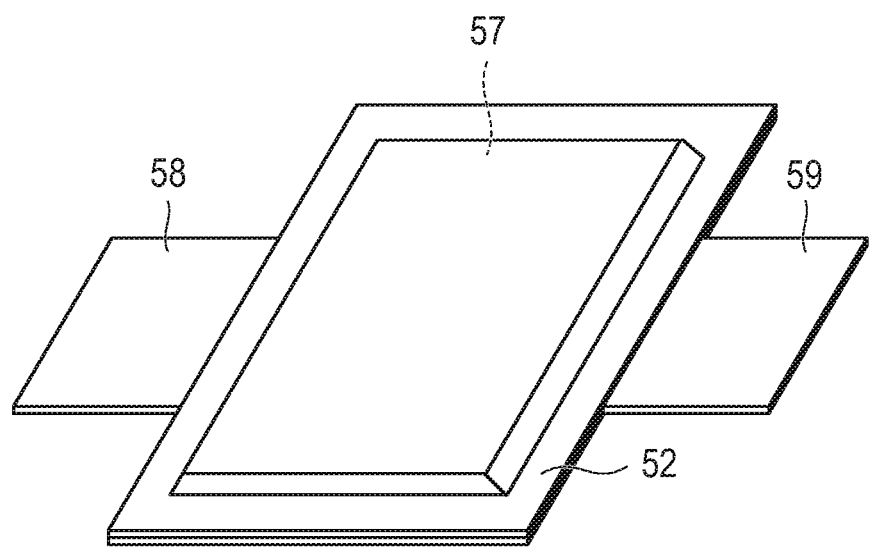
FIG. 2 is a perspective view illustrating an appearance of a flat lithium ion secondary battery which is a typical embodiment of a secondary battery.

FIG. 2 is a perspective view illustrating an appearance of a flat lithium ion secondary battery which is a typical embodiment of a secondary battery.

As illustrated in FIG. 2, a flat bipolar secondary battery 50 has a rectangular flat shape, and a positive electrode tab 58 and a negative electrode tab 59 are drawn from both sides thereof for taking out electric power. A power generating element 57 is surrounded by a battery exterior body (laminate film 52) of the bipolar secondary battery 50. A periphery thereof is thermally fused. The power generating element 57 is sealed while the positive electrode tab 58 and the negative electrode tab 59 are drawn to the outside. Here, the power generating element 57 corresponds to the power generating element 21 of the bipolar secondary battery 10 illustrated in FIG. 1 described above. In the power generating element 57, the plurality of bipolar electrodes 23 is laminated through the electrolytic layers 17.

Note that the above lithium ion secondary battery is not limited to a laminated flat battery. For example, a wound-type lithium ion secondary battery may have a cylindrical shape or a rectangular flat shape obtained by deforming such a cylindrical shape, without any particular limitation. In the above battery having a cylindrical shape, for example, a laminate film or a conventional cylindrical can (metal can) may be used for an exterior body thereof, without any particular limitation. A power generating element is preferably packaged with an aluminum laminate film. This form can achieve reduction in weight.

Drawing of the tabs (58 and 59) illustrated in FIG. 2 is not particularly limited. For example, the positive electrode tab 58 and the negative electrode tab 59 may be drawn from the same side, or each of the positive electrode tab 58 and the negative electrode tab 59 may be divided into a plurality of parts to be drawn from the sides, without being limited to that illustrated in FIG. 2. In the wound-type lithium ion secondary battery, for example, it is only required to form a terminal using a cylindrical can (metal can) in place of the tab.

In a typical electric vehicle, storage space of a battery is about 170 L. Since a cell and an auxiliary machine such as a charge/discharge control device are stored in this space, the storage space efficiency of the cell is usually about 50%. The loading efficiency of the cell in this space is a factor that dominates a cruising distance of an electric car. When the size of a unit cell is small, the loading efficiency is impaired. Therefore, the cruising distance cannot be secured.

Therefore, in the present invention, the battery structure in which the power generating element is coated with the exterior body is preferably large. Specifically, the length of a short side of a laminate cell battery is preferably 100 mm or more. Such a large battery can be used for a vehicle. Here, the length of the short side of the laminate cell battery refers to a side having the shortest length. An upper limit of the length of the short side is not particularly limited, but is usually 400 mm or less.

[Volume Energy Density and Rated Discharge Capacity]

In a general electric vehicle, market request is that a traveling distance (cruising distance) per one charge is 100 km. Considering such a cruising distance, the volume energy density of a battery is preferably 157 Wh/L or more, and the rated capacity thereof is preferably 20 Wh or more.

In addition, an increase in size of a battery can be defined from a relationship to battery area and battery capacity from a viewpoint of a large battery different from a viewpoint of the physical size of an electrode. For example, in a case of a flat lamination type laminated battery, a battery in which a value of the ratio of a battery area (projected area of the battery including a battery exterior body) to the rated capacity is 5 cm$^2$/Ah or more and the rated capacity is 3 Ah or more has a large battery area per unit capacity, and therefore more easily makes the problem of the present invention revealed. That is, due to ion transfer resistance and electron transfer resistance accompanying thickening of a negative electrode active material layer, a charge/discharge reaction is less likely to progress uniformly not only in a thickness direction of the negative electrode active material layer but also in a planar direction, and output characteristics (particularly, output characteristics at a high rate) of the battery tend to be further lowered. Therefore, the non-aqueous electrolyte secondary battery according to the present embodiment is preferable because such a large battery as described above makes an advantage due to exhibition of the effect of the invention of the present application larger. Furthermore, an aspect ratio of a rectangular electrode is preferably 1 to 3, and more preferably 1 to 2. Note that the aspect ratio of an electrode is defined as an aspect ratio of a rectangular positive electrode active material layer. By setting the aspect ratio within such a range, both performance required for a vehicle and a mounting space can be achieved advantageously.

[Assembled Battery]

An assembled battery is formed by connecting a plurality of batteries to each other. Specifically, the assembled battery is formed by serialization of at least two batteries, parallelization thereof, or serialization and parallelization thereof. By serialization and parallelization, capacity and voltage can be freely adjusted.

By connecting a plurality of batteries to each other in series or in parallel, a small assembled battery that can be attached and detached can be formed. By further connecting a plurality of the small assembled batteries that can be attached and detached to each other in series or in parallel, it is also possible to form a large capacity and large output assembled battery suitable for a vehicle driving power source and an auxiliary power source, required to have a high volume energy density and a high volume output density. It is only required to decide how many batteries are connected to each other to manufacture an assembled battery and how many stages of small assembled batteries are laminated to manufacture a large capacity assembled battery depending on the battery capacity or output of a vehicle (electric vehicle) on which the batteries are mounted.

[Vehicle]

In the non-aqueous electrolyte secondary battery of the present embodiment, discharge capacity is maintained even after long-term use, and cycle characteristics are favorable. Furthermore, a volume energy density is high. In a case of use for a vehicle such as an electric vehicle, a hybrid electric vehicle, a fuel cell vehicle, or a hybrid fuel cell vehicle, higher capacity, a larger size, and a longer life are required than in a case of use for an electric/portable electronic device. Therefore, the non-aqueous electrolyte secondary battery can be suitably used as a vehicle power source, for example, for a vehicle driving power source or an auxiliary power source.

Specifically, a battery or an assembled battery formed by combining a plurality of the batteries can be mounted on a vehicle. The present invention makes it possible to form a long life battery having excellent long-term reliability and output characteristics. Therefore, if such a battery is mounted on a vehicle, it is possible to form a plug-in hybrid electric vehicle having a long EV traveling distance and an electric vehicle having a long traveling distance per one charge. This is because by use of a battery or an assembled battery formed by combining a plurality of the batteries, for example, for an automobile such as a hybrid vehicle, a fuel cell vehicle, or an electric vehicle (each of which includes a four-wheel vehicle (a passenger car, a commercial vehicle such as a truck or a bus, a light car, or the like), a two-wheeled vehicle (motorcycle), and a three-wheeled vehicle), a long life and highly reliable automobile can be achieved. However, the use is not limited to an automobile. For example, use as various power sources for another vehicle such as a mobile body including an electric train is possible, and use as a mounting power source such as an uninterruptible power source device is also possible.

EXAMPLES

Hereinafter, the present invention will be described in more detail by Examples. However, the technical scope of the present invention is not limited only to the following Examples. Note that "part" means "part by mass" unless otherwise specified. Steps from preparation of a positive electrode active material layer slurry and a negative electrode active material layer slurry to manufacture of a non-aqueous electrolyte secondary battery were performed in a dry room.

<Tensile Elongation at Break of Coating Resin in Saturated Liquid Absorbing State>

A coating resin solution obtained by the following method was cast on a PET film and dried to form a sheet having a thickness of 500 µm, and then the sheet was punched into a dumbbell shape. Then, the sheet was immersed in an electrolytic solution (1 M $LiPF_6$, ethylene carbonate (EC)/diethyl carbonate (DEC)=3/7 (volume ratio)) at 50° C. for three days. Thereafter, a value of tensile elongation at break in a saturated liquid absorbing state was measured in accordance with ASTM D683 (test piece shape: Type II).

<Porosity of Active Material Layer>

The porosity of an active material layer was calculated according to the following formula (1). Note that an electrolytic solution is partially present in the voids.

porosity (%)=100−solid content occupying volume ratio (%) of active material layer   Formula (1)

Here, the "solid content occupying volume ratio (%)" of an active material layer is calculated by the following formula (2).

solid content occupying volume ratio (%)=(solid material volume ($cm^3$)/electrode volume ($cm^3$))×100   Formula (2)

Note that the electrode volume was calculated from the thickness of an electrode and a coated area. The solid material volume was determined by the following procedure.

(a) The addition amount of each material contained in an active material layer slurry was weighed.

(b) The active material layer slurry was applied to a surface of a current collector, and then the weights of the current collector and a coating film were weighed.

(c) The slurry after application was pressed, and the weights of the current collector and the coating film after pressing were weighed.

(d) The amount of an electrolytic solution absorbed during pressing was calculated by "value obtained in (c)−value obtained in (b)".

(e) The weight of each material in an electrode after pressing was calculated from the values of (a), (c), and (d).

(f) The volume of each material in an electrode was calculated from the weight of each material calculated in (e) and the density of each material.

(g) The solid material volume was calculated by adding only the volumes of solid materials among the volumes of the materials calculated in (f).

<Density of Active Material Layer>

The density of an active material layer was calculated according to the following formula (3).

electrode density (g/$cm^3$)=weight of solid material (g)/electrode volume ($cm^3$)   Formula (3)

Note that the weight of a solid material was calculated by adding only the weights of the solid materials among the weights of the materials in an electrode after pressing obtained in the above (e). The electrode volume was calculated from the thickness of an electrode and a coated area.

<Manufacture of Coating Resin Solution>

Into a four-necked flask equipped with a stirrer, a thermometer, a reflux condenser, a dropping funnel, and a nitrogen gas inlet tube, 83 parts of ethyl acetate and 17 parts of methanol were put, and the temperature was raised to 68° C.

Subsequently, a monomer blending solution containing 242.8 parts of methacrylic acid, 97.1 parts of methyl methacrylate, 242.8 parts of 2-ethylhexyl methacrylate, 52.1 parts of ethyl acetate, and 10.7 parts of methanol, and an initiator solution having 0.263 parts of 2,2'-azobis(2,4-dimethylvaleronitrile) dissolved in 34.2 parts of ethyl acetate were continuously dropwise added using a dropping funnel over four hours under stirring while nitrogen was blown into the four-necked flask to perform radical polymerization. After completion of the dropwise addition, an initiator solution having 0.583 parts of 2,2'-azobis(2,4-dimethylvaleronitrile) dissolved in 26 parts of ethyl acetate was continuously added using a dropping funnel over two hours. The polymerization was further continued for four hours at a boiling point. The solvent was removed to obtain 582 parts of a resin. Thereafter, 1,360 parts of isopropanol was added to obtain a coating resin solution containing a vinyl resin having a resin concentration of 30% by mass.

Note that the tensile elongation at break of the coating resin in a saturated liquid absorbing state was measured using the obtained coating resin solution by the above method and found to be 50%.

<Manufacture of Coated Positive Electrode Active Material Particles>

Into a universal mixer, 93.9 parts of $LiNi_{0.8}Co_{0.15}Al_{0.05}O_2$ powder was put. While the powder was stirred at room temperature (25° C.) at 150 rpm, a coating resin solution (resin solid content concentration: 30% by mass) was dropwise added and mixed over 60 minute so as to be 0.3 parts as a resin solid content, and the mixture was further stirred for 30 minutes.

Subsequently, 5.8 parts of acetylene black [Denka Black (registered trademark) manufactured by Denki Kagaku Kogyo Co., Ltd.] (average particle diameter (primary particle diameter): 0.036 µm)) was mixed in three portions in a stirred state. The temperature was raised to 70° C. while the mixture was stirred for 30 minutes. The pressure was reduced to 100 mmHg and maintained for 30 minutes to obtain coated positive electrode active material particles. Note that the average particle diameter of the $LiNi_{0.8}Co_{0.15}Al_{0.05}O_2$ powder as a core was 8 µm considering that the coated positive electrode active material particles have a core-shell structure. The solid content of a coating agent was 0.1% by mass with respect to 100% by mass of the coated positive electrode active material particles.

<Manufacture of Coated Negative Electrode Active Material Particles>

Into a universal mixer, 88.4 parts of hardly graphitizable carbon (Carbotron (registered trademark) PS(F) manufactured by Kureha Battery Materials Japan K.K.) was put. While the carbon was stirred at room temperature at 150 rpm, a coating resin solution (resin solid content concentration: 30% by mass) was dropwise added and mixed over 60 minute so as to be 10 parts as a resin solid content, and the mixture was further stirred for 30 minutes.

Subsequently, 1.6 parts of acetylene black [Denka Black (registered trademark) manufactured by Denki Kagaku Kogyo Co., Ltd.] was mixed in three portions in a stirred state. The temperature was raised to 70° C. while the mixture was stirred for 30 minutes. The pressure was reduced to 0.01 MPa and maintained for 30 minutes to obtain coated negative electrode active material particles. Note that the average particle diameter of the hardly graphitizable carbon powder as a core was 9 µm considering that the coated negative electrode active material particles have a core-shell structure. The solid content of a coating agent was 1.6% by mass with respect to 100% by mass of the coated negative electrode active material particles.

<Preparation of Electrolytic Solution>

$LiPF_6$ was dissolved at a ratio of 1 mol/L in a mixed solvent of ethylene carbonate (EC) and propylene carbonate (PC) (volume ratio 1:1) to obtain an electrolytic solution.

<Preparation of Positive Electrode Active Material Layer Slurry>

98 parts of the coated positive electrode active material particles obtained above and 2 parts of a carbon fiber (DONACARBO Milled S-243 manufactured by Osaka Gas Chemicals Co., Ltd., average fiber length: 500 μm, average fiber diameter: 13 μm: electric conductivity: 200 mS/cm) as a conductive member were dried for 16 hours at 120° C. under reduced pressure of 100 mmHg to remove moisture contained.

Next, in a dry room, 47 parts of the electrolytic solution obtained above was added to the dried material. This mixture was mixed for 120 seconds at 2000 rpm using a mixing defoaming machine (ARE 250, manufactured by Thinky Corporation) to obtain a positive electrode active material layer slurry.

<Preparation of Negative Electrode Active Material Layer Slurry>

98 parts of the coated negative electrode active material particles obtained above and 2 parts of a carbon fiber (DONACARBO Milled S-243 manufactured by Osaka Gas Chemicals Co., Ltd., average fiber length: 500 μm, average fiber diameter: 13 μm: electric conductivity: 200 mS/cm) as a conductive member were dried for 16 hours at 120° C. under reduced pressure of 100 mmHg to remove moisture contained.

Next, in a dry room, 90 parts of the electrolytic solution obtained above was added to the dried material. This mixture was mixed for 120 seconds at 2000 rpm using a mixing defoaming machine (ARE 250, manufactured by Thinky Corporation) to obtain a negative electrode active material layer slurry.

Example 1

<Manufacture of Positive Electrode>

A carbon-coated aluminum foil (manufactured by Showa Denko K.K., thickness of carbon layer: 1 μm, thickness of aluminum layer: 20 μm, size: 61×72 mm) as a positive electrode current collector was prepared, and was masked using a PET sheet such that the size of a slurry application portion was 29×40 mm. A positive electrode active material layer slurry was applied onto the positive electrode current collector using an applicator such that a gap of the applicator was 270 μm. An aramid sheet (thickness: 45 μm, manufactured by Japan Vilene Company, Ltd.) was placed on a surface of the slurry after application and pressed at 20 MPa using a high pressure jack J-1 (manufactured by AS ONE Corporation) to obtain a positive electrode. Note that the positive electrode had a thickness of 216 μm, a porosity of 43.0%, and a density of 2.44 $g/cm^3$. When a cross section of the obtained positive electrode active material layer was confirmed with a scanning electron microscope (SEM), at least a part of a conductive member formed a conductive path for electrically connecting a first main surface in contact with an electrolytic layer side of the positive electrode active material layer to a second main surface in contact with a current collector side.

<Manufacture of Negative Electrode>

A copper foil (manufactured by THANK METAL Co., Ltd., thickness: 10 μm, size: 61×72 mm) as a negative electrode current collector was prepared and masked using a PET sheet such that the size of a slurry application portion was 33×44 mm. A negative electrode active material layer slurry was applied onto the negative electrode current collector using an applicator such that a gap of the applicator was 320 μm. An aramid sheet (thickness: 45 μm, manufactured by Japan Vilene Company, Ltd.) was placed on a surface of the slurry after application and pressed at 20 MPa using a high pressure jack J-1 (manufactured by AS ONE Corporation) to obtain a negative electrode. Note that the negative electrode had a thickness of 309 μm, a porosity of 43.1%, and a density of 0.88 $g/cm^3$. When a cross section of the obtained negative electrode active material layer was confirmed with a scanning electron microscope (SEM), at least a part of a conductive member formed a conductive path for electrically connecting a first main surface in contact with an electrolytic layer side of the negative electrode active material layer to a second main surface in contact with a current collector side.

<Manufacture of Non-Aqueous Electrolyte Secondary Battery>

The positive electrode active material layer of the positive electrode obtained above and the negative electrode active material layer of the negative electrode obtained above were caused to face each other. A separator (manufactured by Celgard, LLC., #3501, thickness: 25 μm, size: 96×107 mm) was disposed therebetween to form a power generating element. Tabs were connected to the positive electrode current collector and the negative electrode current collector, respectively, and the power generating element was sandwiched by an exterior body made of an aluminum laminate film. Then, three sides of the exterior body were thermocompression-sealed to house the power generating element. An electrolytic solution was additionally injected into the power generating element as necessary such that the amount of the electrolytic solution per cell was 0.6 mL, and the exterior body was sealed such that the tabs were led out under vacuum to obtain a non-aqueous electrolyte secondary battery.

Examples 2 to 4 and Comparative Examples 1 and 2

A positive electrode, a negative electrode, and a non-aqueous electrolyte secondary battery were obtained in a similar manner to Example 1 except that the application amounts and the pressing conditions of the positive electrode active material layer slurry and the negative electrode active material layer slurry in <Manufacture of positive electrode> and <Manufacture of negative electrode> in Example 1 were changed as illustrated in the following Table 1. Note that the thickness, porosity, and, density of each of the positive electrode active material layer and the negative electrode active material layer obtained in each Example are illustrated in the following Table 2.

TABLE 1

| | Negative electrode active material layer | | Positive electrode active material layer | |
|---|---|---|---|---|
| | Gap of applicator (μm) | Pressing condition (MPa) | Gap of applicator (μm) | Pressing condition (MPa) |
| Example 1 | 320 | 20 | 270 | 20 |
| Example 2 | 330 | 20 | 270 | 20 |
| Comparative Example 1 | 320 | 50 | 270 | 20 |

TABLE 1-continued

| | Negative electrode active material layer | | Positive electrode active material layer | |
|---|---|---|---|---|
| | Gap of applicator (μm) | Pressing condition (MPa) | Gap of applicator (μm) | Pressing condition (MPa) |
| Example 3 | 950 | 20 | 780 | 20 |
| Example 4 | 950 | 20 | 780 | 20 |
| Comparative Example 2 | 950 | 45 | 780 | 20 |

<Evaluation of Output Characteristics>

Discharge capacity was measured by the following method.

First, charge was performed up to a state of SOC (State of Charge) of 100% under the following charging conditions. Thereafter, constant current discharge was performed at each discharge rate illustrated in the following Table 2 until battery voltage reached 2.5 V, and capacity discharged during the discharge was calculated.

(Charging Conditions)

Up to 3.9 V: constant current charge (0.1 C)
Up to 4.0 V: constant current charge (0.05 C)
Up to 4.2 V: constant current charge (0.025 C)
4.2 V: constant voltage charge (until a current value reaches 0.01 C or less)

Results are illustrated in the following Table 2.

TABLE 2

| | Negative electrode active material layer | | | Positive electrode active material layer | | | Ratio of discharge capacity (capacity to 0.05 C) | |
|---|---|---|---|---|---|---|---|---|
| | Thickness μm | Porosity % | Density g/cm³ | Thickness μm | Porosity % | Density g/cm³ | 1 C % | 0.1 C % |
| Example 1 | 318 | 43.2 | 0.87 | 223 | 45.1 | 2.35 | 37 | |
| Example 2 | 323 | 40.8 | 0.90 | 221 | 45.0 | 2.36 | 38 | |
| Comparative Example 1 | 368 | 34.3 | 1.00 | 235 | 44.9 | 2.36 | 21 | |
| Example 3 | 824 | 45.6 | 0.83 | 569 | 48.1 | 2.23 | | 96 |
| Example 4 | 852 | 44.8 | 0.84 | 588 | 48.1 | 2.23 | | 96 |
| Comparative Example 2 | 867 | 38.8 | 0.93 | 598 | 48.0 | 2.24 | | 75 |

The results illustrated in Table 2 indicate that the non-aqueous electrolyte secondary battery according to the present invention has a large ratio of discharge capacity at the time of output at a high rate (1 C or 0.1 C) to discharge capacity at the time of output at 0.05 C and has excellent output characteristics.

REFERENCE SIGNS LIST 10, 50 Bipolar secondary battery
11 Current collector
11a Outermost layer current collector on positive electrode side
11b Outermost layer current collector on negative electrode side
13 Positive electrode active material layer
15 Negative electrode active material layer
17 Electrolytic layer
19 Unit battery layer
21, 57 Power generating element
23 Bipolar electrode
25 Positive electrode current collecting plate (positive electrode tab)
27 Negative electrode current collecting plate (negative electrode tab)
29, 52 Battery exterior body
31 Sealing portion
58 Positive electrode tab
59 Negative electrode tab

The invention claimed is:

1. A negative electrode for non-aqueous electrolyte secondary battery having a negative electrode active material layer having a thickness of 150 to 1500 μm formed on a surface of a current collector, wherein
the negative electrode active material layer includes coated negative electrode active material particles in which at least a part of a surface of a negative electrode active material is coated with a coating agent containing a coating resin and a conductive aid,
a porosity of the negative electrode active material layer is 39.0% to 45.6% and a density of the negative electrode active material layer is 0.80 g/cm³ to 0.91 g/cm³, and
the coated negative electrode active material particles have a core-shell structure in which a shell portion made of the coating agent containing the coating resin and the conductive aid is formed on the surface of a core portion made of the negative electrode active material.

2. The negative electrode for non-aqueous electrolyte secondary battery according to claim 1, wherein a porosity of the negative electrode active material layer is 40.8% or more and 45.6% or less.

3. The negative electrode for non-aqueous electrolyte secondary battery according to claim 1, wherein a tensile elongation at break of the coating resin is 10% or more in a saturated liquid absorbing state.

4. The negative electrode for non-aqueous electrolyte secondary battery according to claim 1, wherein a content of a binder in the negative electrode active material layer is 1% by mass or less with respect to a total solid content of 100% by mass.

5. The negative electrode for non-aqueous electrolyte secondary battery according to claim 1, wherein the coating resin is at least one selected from the group consisting of a polyurethane resin and a polyvinyl-based resin.

6. The negative electrode for non-aqueous electrolyte secondary battery according to claim 1, wherein a content of a binder in the negative electrode active material layer is 0.1% by mass or less with respect to a total solid content of 100% by mass.

7. The negative electrode for non-aqueous electrolyte secondary battery according to claim 1, wherein a content of a binder in the negative electrode active material layer is 0% by mass with respect to a total solid content of 100% by mass.

8. A non-aqueous electrolyte secondary battery comprising a power generating element including:
- the negative electrode for non-aqueous electrolyte secondary battery according to claim 1;
- a positive electrode having a positive electrode active material layer including a positive electrode active material formed on a surface of a current collector; and
- an electrolytic layer disposed between the negative electrode and the positive electrode.

9. The non-aqueous electrolyte secondary battery according to claim 8, wherein
- the negative electrode active material layer further includes a conductive member,
- at least a part of the conductive member forms a conductive path for electrically connecting a first main surface in contact with the electrolytic layer side of the negative electrode active material layer to a second main surface in contact with the current collector side, and
- the conductive path and the negative electrode active material are electrically connected to each other.

* * * * *